United States Patent
Kogane et al.

(10) Patent No.: US 7,649,547 B2
(45) Date of Patent: Jan. 19, 2010

(54) SURVEILLANCE VIDEO CAMERA WITH A PLURALITY OF SENSITIVITY ENHANCING UNITS

(75) Inventors: Haruo Kogane, Kawasaki (JP); Yasuji Nakamura, Yokohama (JP); Makoto Takakuwa, Yokohama (JP)

(73) Assignee: Panasonic Corporation, Osaka (JP)

( * ) Notice: Subject to any disclaimer, the term of this patent is extended or adjusted under 35 U.S.C. 154(b) by 788 days.

(21) Appl. No.: 10/941,456

(22) Filed: Sep. 15, 2004

(65) Prior Publication Data

US 2005/0057650 A1    Mar. 17, 2005

(30) Foreign Application Priority Data

Sep. 17, 2003    (JP) .............................. 2003-324896

(51) Int. Cl.
    *H04N 9/47*    (2006.01)
(52) U.S. Cl. .................................... 348/143; 348/220.1
(58) Field of Classification Search .................. 348/143, 348/220.1
    See application file for complete search history.

(56) References Cited

U.S. PATENT DOCUMENTS

| 5,512,947 | A | * | 4/1996 | Sawachi et al. ............. 348/243 |
| 5,847,756 | A | * | 12/1998 | Iura et al. ................. 348/220.1 |
| 6,181,379 | B1 | | 1/2001 | Kingetsu et al. |
| 6,570,613 | B1 | | 5/2003 | Howell |
| 7,239,344 | B1 | * | 7/2007 | Ikoma et al. ............. 348/216.1 |

| 2003/0030729 | A1 | | 2/2003 | Prentice et al. |
| 2003/0093805 | A1 | * | 5/2003 | Gin ............................ 725/105 |
| 2004/0263628 | A1 | | 12/2004 | Ambiru et al. |

FOREIGN PATENT DOCUMENTS

| JP | 8-307774 | | 11/1996 |
| JP | 11-355635 | A | 12/1999 |
| JP | 2000-236532 | A | 8/2000 |
| JP | 2001-036807 | A | 2/2001 |
| JP | 2003-087633 | A | 3/2003 |
| JP | 2005-20565 | A | 1/2005 |
| WO | 0217235 | A2 | 2/2002 |
| WO | 03043316 | A1 | 5/2003 |

OTHER PUBLICATIONS

European Search Report dated Aug. 12, 2008.

* cited by examiner

*Primary Examiner*—Y. Lee
*Assistant Examiner*—Richard Torrente
(74) *Attorney, Agent, or Firm*—Pearne & Gordon LLP

(57) ABSTRACT

A surveillance video camera to be operative in combination with a surveillance system for watching an object, includes: an optical section having passed therethrough light to be provided as an image indicative of the object; a converting section constituted by a plurality of pixel units to be exposed to the light provided through the optical section; a plurality of sensitivity enhancing units; a surveillance mode selecting section for selectively setting at least two surveillance modes; and an executing section for allowing the sensitivity enhancing units to start, in sequence corresponding to the selected surveillance mode, to enhance the sensitivity of the converting section, and to stop enhancing the sensitivity of the converting section, the sequences corresponding to the respective surveillance modes being different from each other.

9 Claims, 16 Drawing Sheets

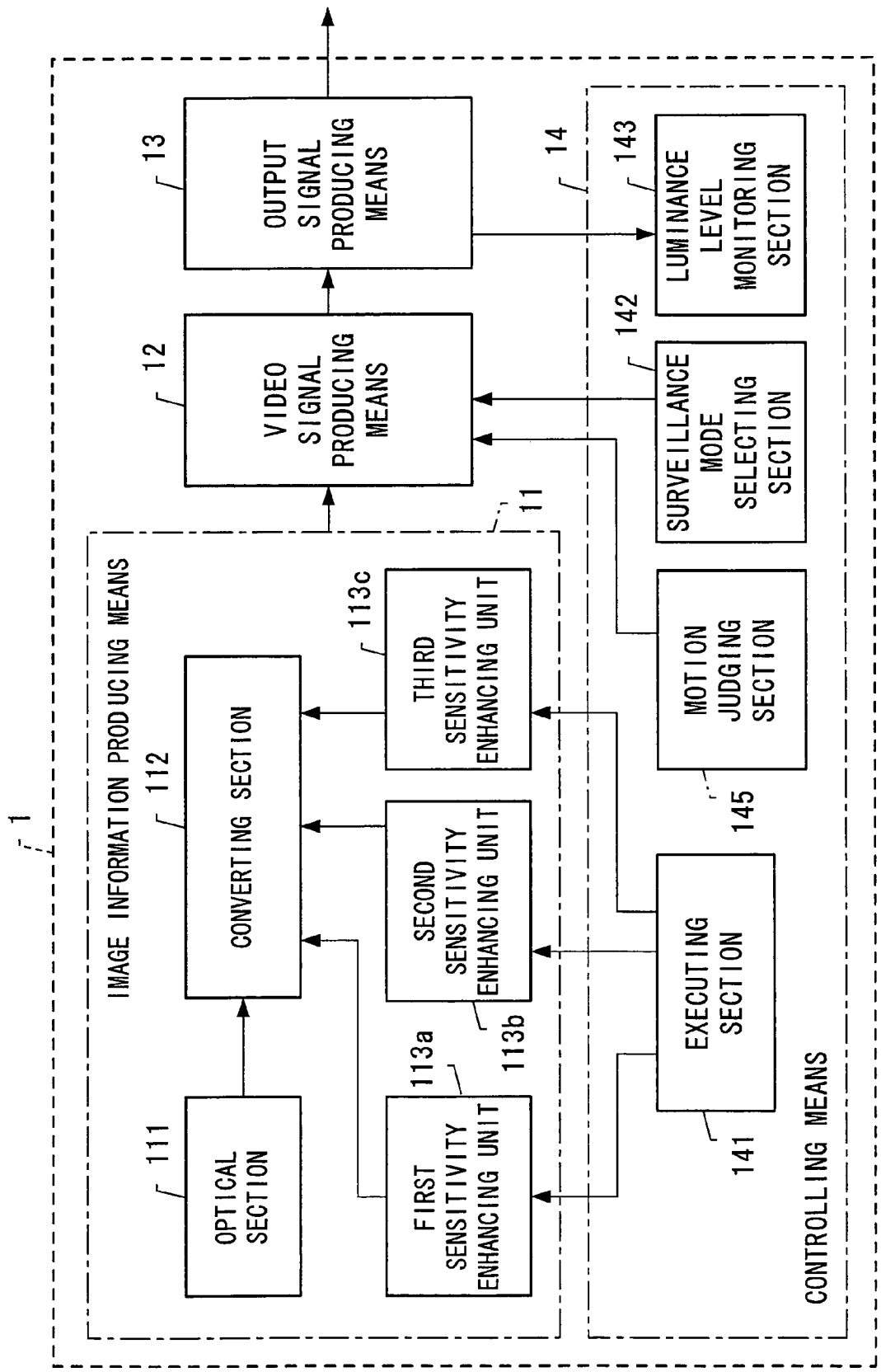

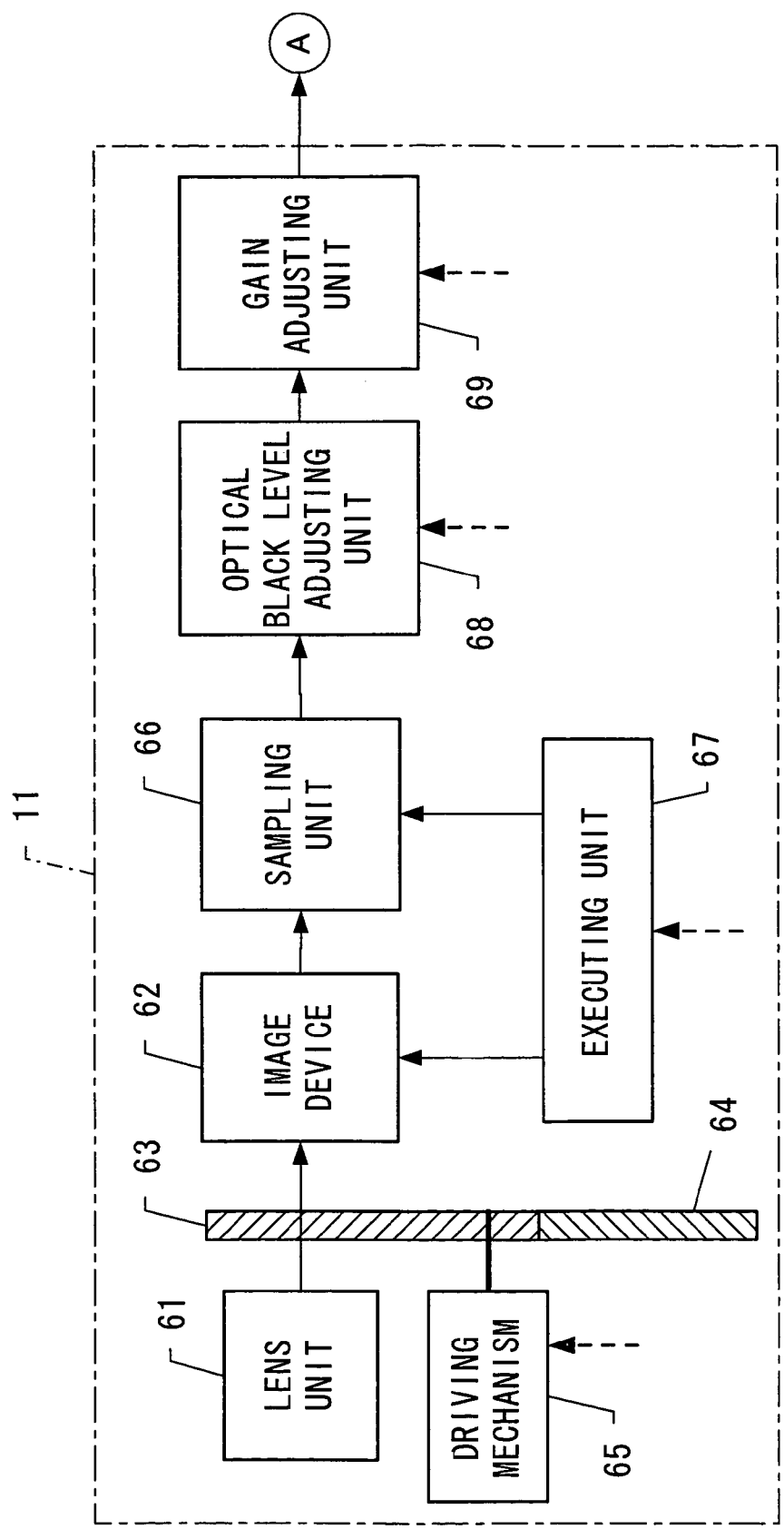

FIG. 3

| | ADVANTAGES | DISADVANTAGES |
|---|---|---|
| SYNTHESIS OF PIXELS | RESOLUTION OF MOTION OF IMAGE DOES NOT DROP. | RESOLUTION OF IMAGE DROPS. COLOR IMAGE CANNOT BE TAKEN BY CAMERA HAVING SINGLE IMAGING SENSOR. |
| ADDITION OF INFRARED LIGHT | RESOLUTION OF MOTION OF IMAGE DOES NOT DROP. RESOLUTION OF IMAGE CAN BE MAINTAINED WITHOUT BEING DROPED. | IT IS NECESSARY TO DETACH INFRARED LIGHT ELIMINATION FILTER. IMAGE CANNOT BE TAKEN IN COLOR. |
| LONG EXPOSURE | RESOLUTION OF IMAGE CAN BE MAINTAINED WITHOUT BEING DROPED. IMAGE CAN BE TAKEN IN COLOR. | RESOLUTION OF MOTION OF IMAGE DOES NOT DROP. |

FIG. 4

| | STEPS OF SENSITIVITY ENHANCEMENT | | | EVALUATION RESULT | PRIORITY LEVEL |
|---|---|---|---|---|---|
| | FIRST STEP | SECOND STEP | THIRD STEP | | |
| 1 | SYNTHESIS OF PIXELS | ADDITION OF INFRARED LIGHT | LONG EXPOSURE | DETERIORATION OF RESOLUTION AT FIRST STEP | MOTION PRIORITY MODE |
| 2 | SYNTHESIS OF PIXELS | LONG EXPOSURE | ADDITION OF INFRARED LIGHT | DETERIORATION OF RESOLUTION AT FIRST STEP | |
| 3 | ADDITION OF INFRARED LIGHT | SYNTHESIS OF PIXELS | LONG EXPOSURE | PREFERRED APPROACH ON MOTION PRIORITY MODE | |
| 4 | ADDITION OF INFRARED LIGHT | LONG EXPOSURE | SYNTHESIS OF PIXELS | DETERIORATION OF MOTION AT SECOND STEP | RESOLUTION PRIORITY MODE |
| 5 | LONG EXPOSURE | SYNTHESIS OF PIXELS | ADDITION OF INFRARED LIGHT | DETERIORATION OF RESOLUTION AT SECOND STEP | |
| 6 | LONG EXPOSURE | ADDITION OF INFRARED LIGHT | SYNTHESIS OF PIXELS | PREFERRED APPROACH ON RESOLUTION PRIORITY MODE | |

SURVEILLANCE VIDEO CAMERA WITH A PLURALITY OF SENSITIVITY ENHANCING UNITS

BACKGROUND OF THE INVENTION

1. Technical Field of the Invention

The present invention relates to a surveillance video camera, and more particularly to a surveillance video camera to be operative in combination with a surveillance system for watching an object such as for example unqualified people and other intruders, and adapted to take an image indicative of the object at a relatively high quality without being affected by an illumination intensity.

2. Description of the Related Art

Up until now, there have been proposed a wide variety of surveillance video cameras of this type one typical example of which is disclosed in Japanese Patent Laying-Open Publication No. H08-307774 (paragraph 0026, FIG. 1).

The above mentioned conventional surveillance video camera comprises three image sensors for respectively sensing color component images collectively indicative of an object to selectively take sensitivity enhancing modes such as for example a long exposure mode and a pixel synthesis mode.

In order to enhance the sensitivity of the image sensor, the exposure period of the image sensor is generally extended in reduced illumination. However, the resolution of the motion of the object is deteriorated by reason that the field number of the images to be taken per unit time are decreased when each of the images is taken over the extended exposure period. In the pixel synthesis mode, the image can be taken at relatively high quality by reason that the color components respectively sensed by the image sensors are not mixed with each other.

On the other hand, in the single image sensor type-surveillance video camera, the image cannot be taken at relatively high quality by reason that the color components sensed by the image sensor are mixed with each other. It is, however, not always essential that the image can be taken in color in reduced illumination such as for example a night.

The conventional surveillance video camera thus constructed as previously mentioned, however, encounters such a problem that the three image sensors type is not simple in construction, and produced at a relatively expensive cost in comparison with single image sensor type.

SUMMARY OF THE INVENTION

It is, therefore, an object of the present invention to provide a surveillance video camera which can enhance the sensitivity of the image device to produce image information at relatively high quality without being affected by the illumination intensity.

It is another object of the present invention to provide a surveillance video camera which can be simple in construction in comparison with the conventional surveillance video camera.

It is a further object of the present invention to provide a surveillance video camera which can be produced at a relatively low cost in comparison with the conventional surveillance video camera.

According to one aspect of the present invention, there is provided a surveillance video camera to be operative in combination with a surveillance system for watching an object having a light produced thereon, comprising: imaging information producing means for producing image information indicative of the object; video signal producing means for producing a video signal on the basis of the image information produced by the image information producing means; and controlling means for controlling each of the imaging information producing means and the video signal producing means to ensure that the object is watched by the surveillance system through the video signal produced by the video signal producing means, wherein the image information producing means includes: an optical section having passed therethrough the light to be provided as an image indicative of the object; a converting section having a sensitivity to the light, the converting section being constituted by a plurality of pixel units to be exposed to the light provided through the optical section over an exposure period to sense the image; and a plurality of sensitivity enhancing unit each for enhancing the sensitivity of the converting section to have the converting section sense the image, and the controlling means includes an executing section for allowing the sensitivity enhancing unit to start in a predetermined sequence to enhance the sensitivity of the converting section, and to stop in an inverse order of the predetermined sequence enhancing the sensitivity of the converting section.

In the surveillance video signal according to the present invention, the pixel units may be classified into a plurality of pixel groups each to be constituted by two or more pixel units adjacent to each other. The sensitivity enhancing unit may include: a first sensitivity enhancing unit for allowing each of the pixel groups to produce pixel information partially inductive of the image under the condition that the pixel units are exposed to the light provided through the optical section; and a second sensitivity enhancing unit for extending the exposure period to have the converting section sense the image under the condition that the pixel units are exposed to the light provided through the optical section over the extended exposure period.

The optical section may include a lens unit to be located in spaced relationship with the converting section, an optical filter operable to have passed therethrough only the visible light to be provided to the converting section, and a switching mechanism for driving the optical filter to assume two different operation states including a first operation state to allow the first optical filter to be provided between the lens unit and the converting section to ensure that the converting section is exposed to the visible light, and a second operation state to prevent the second optical filter from being provided between the lens unit and the converting section to ensure that the converting section is exposed to both the visible light and the infrared light. The sensitivity enhancing unit may include a third sanctity enhancing unit for enhancing the sensitivity of the converting section by controlling the switching mechanism in response to the luminance level of the video signal produced by the video signal producing means.

The executing section may be adapted to allow each of the first to third sensitivity enhancing units to start in order of the third, first, and second sensitivity enhancing units to enhance the sensitivity of the converting section, and to allow each of the first to third sensitivity enhancing units to stop in order of the second, first, and third sensitivity enhancing units enhancing the sensitivity of the converting section in response to the luminance level of the video signal produced by the video signal producing means when the motion priority mode is being assumed by the image information producing means.

The executing section may be adapted to allow each of the first to third sensitivity enhancing units to start in order of the second, third, and first sensitivity enhancing units to enhance the sensitivity of the converting section, and to allow the first to third sensitivity enhancing units to stop in order of the first, third, and second sensitivity enhancing units enhancing the sensitivity of the converting section in response to the luminance level of the video signal produced by the video signal producing means when the resolution priority mode is being assumed by the image information producing means.

The controlling means may further include an illumination level monitoring section for judging whether or not the luminance level of the video signal produced by the video signal producing means is within a predetermined range. The executing section may be adapted to allow each of the sensitivity enhancing units to start in the predetermined sequence to enhance the sensitivity of the converting section, and to stop in the inverse order of the predetermined sequence enhancing the sensitivity of the converting section on the basis of the judgment of the illumination level monitoring section.

The imaging information producing means may further include an adjusting section for adjusting an optical black level and a gain of the electric signal produced by the converting section. The controlling means may further include a compensation section for compensate the optical black level and the gain to be adjusted by the adjusting section when each of the sensitivity enhancing units is operated to start to enhance, and to stop enhancing the sensitivity of the converting section.

BRIEF DESCRIPTION OF THE DRAWINGS

The features and advantages of a surveillance video camera according to the present invention will more clearly be understood from the following description taken in conjunction with the accompanying drawings in which:

FIG. 1 is a block diagram showing the constitution of the first preferred embodiment of the surveillance video camera according to the present invention;

FIG. 2b is a block diagram showing the imaging information producing means of the surveillance video camera shown in FIG. 2a;

FIG. 2c is a block diagram showing the video signal producing means and the output signal producing means of the surveillance video camera shown in FIG. 2a;

FIG. 3 is a descriptive view showing the advantages and disadvantages of the pixel synthesis mode, infrared addition mode, and long exposure mode of the surveillance video camera according to the present invention;

FIG. 4 is a descriptive view showing the combination of the pixel synthesis mode, infrared addition mode, and long exposure mode of the surveillance video camera according to the present invention;

DESCRIPTION OF THE PREFERRED EMBODIMENTS

Figure 2A:
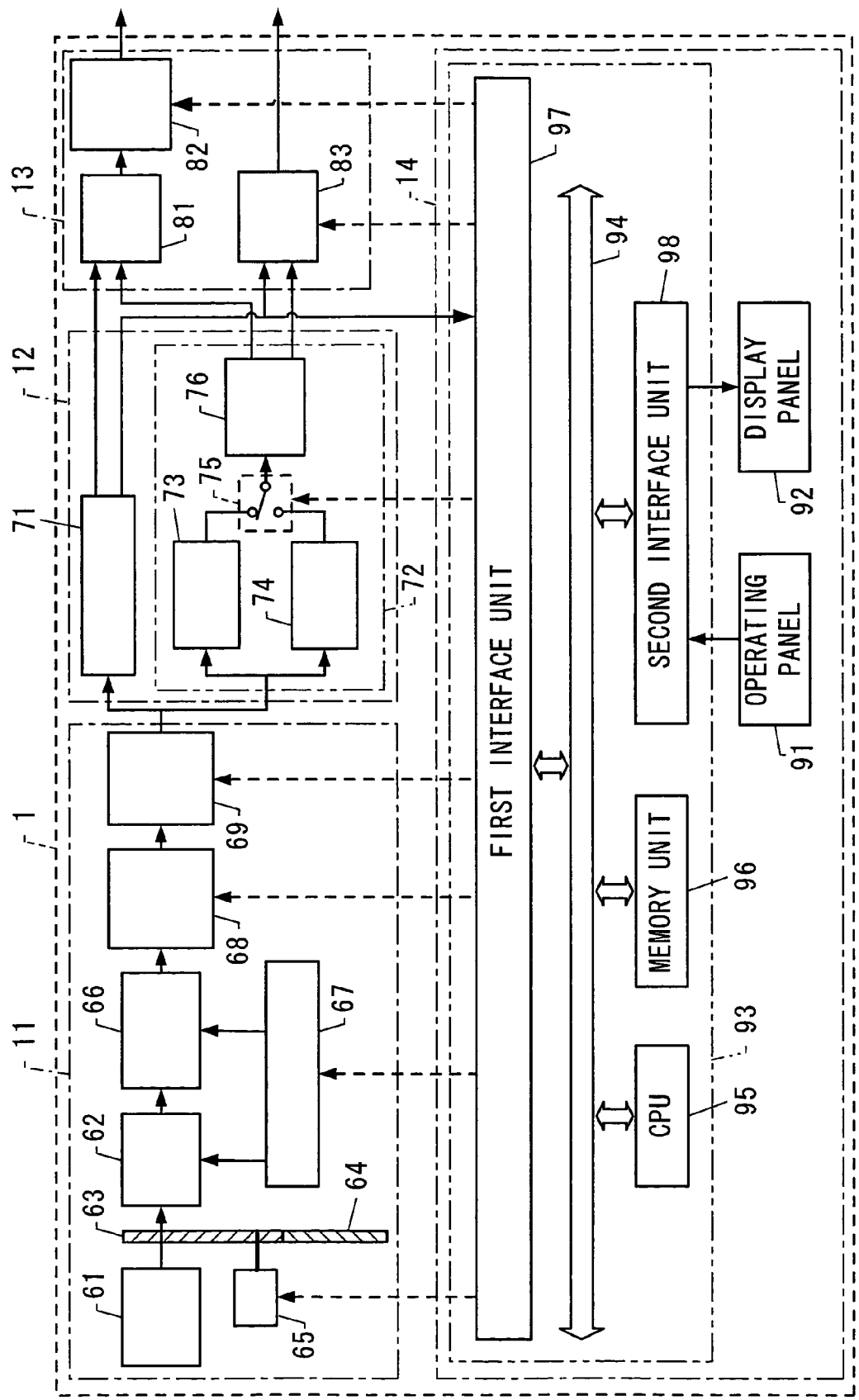
FIG. 2a is a block diagram showing the hardware configuration of the first preferred embodiment of the surveillance video camera according to the present invention.

Throughout the following detailed description, similar reference characters and numbers refer to similar elements in all figures of the drawings.

The first preferred embodiment of the surveillance video camera according to the present invention will now be described hereinafter with reference to FIGS. 1 to 9 of the accompanying drawings.

The surveillance video camera 1 is operative in combination with a surveillance system (not shown) for watching an object having a light produced thereon. The surveillance video camera 1 is shown in FIG. 1 as comprising imaging information producing means 11 for producing image information indicative of the object, video signal producing means 12 for producing a video signal on the basis of the image information produced by the image information producing means 11, and controlling means 14 for controlling each of the imaging information producing means 11 and the video signal producing means 12 to ensure that the object is watched by the surveillance system through the video signal produced by the video signal producing means 12.

The image information producing means 11 includes an optical section 111 having passed therethrough the light to be provided as an image indicative of the object, and a converting section 112 having sensitivity to the light. The converting section 112 is constituted by a plurality of pixel units to be exposed to the light provided through the optical section 111 over an exposure period to sense the image. The image information producing means 11 further includes a plurality of sensitivity enhancing units 113 each for enhancing the sensitivity of the converting section 112 to have the converting section 112 sense the image.

The optical section 111 includes a lens unit 61 to be located in spaced relationship with the converting section 112, an optical filter 63 operable to have passed therethrough only the visible light to be provided to the converting section 112, and a switching mechanism 65 for driving the optical filter 63 to assume two different operation states including a first operation state to allow the first optical filter 63 to be provided between the lens unit 61 and the converting section 112 to ensure that the converting section 112 is exposed to the visible light, and a second operation state to prevent the second optical filter 64 from being provided between the lens unit 61 and the converting section 112 to ensure that the converting section 112 is exposed to both the visible light and the infrared light.

The pixel units are classified into a plurality of pixel groups each to be constituted by two or more pixel units adjacent to each other.

The sensitivity enhancing units includes a first sensitivity enhancing unit 113a for allowing each of the pixel groups to produce pixel information partially inductive of the image under the condition that the pixel units are exposed to the light provided through the optical section 111, a second sensitivity enhancing unit 113b for extending the exposure period to have the converting section 112 sense the image under the condition that the pixel units are exposed to the light provided through the optical section 111 over the extended exposure period, and a third sanctity enhancing unit 113c for enhancing the sensitivity of the converting section 112 by controlling the switching mechanism 65 in response to the luminance level of the video signal produced by the video signal producing means 12.

The executing section 141 is adapted to allow each of the first to third sensitivity enhancing units 113 to start in order of the third, first, and second sensitivity enhancing units 113 to enhance the sensitivity of the converting section 112, and to allow each of the first to third sensitivity enhancing units 113 to stop in order of the second, first, and third sensitivity enhancing units 113 enhancing the sensitivity of the converting section 112 in response to the luminance level of the video signal produced by the video signal producing means 12 when the motion priority mode is being assumed by the image information producing means 11. The executing section 141 is adapted to allow each of the first to third sensitivity enhancing units 113 to start in order of the second, third, and first sensitivity enhancing units 113 to enhance the sensitivity of the converting section 112, and to allow the first to third sensitivity enhancing units 113 to stop in order of the first, third, and second sensitivity enhancing units 113 enhancing the sensitivity of the converting section 112 in response to the luminance level of the video signal-produced by the video signal producing means 12 when the resolution priority mode is being assumed by the image information producing means 11.

The controlling means 14 further includes an executing section 141 for allowing the sensitivity enhancing unit 113 to start in a predetermined sequence to enhance the sensitivity of the converting section 112, and to stop in an inverse order of the predetermined sequence enhancing the sensitivity of the converting section 112, a surveillance mode selecting section 142 for selecting one surveillance mode from among the motion priority mode, the resolution priority mode, and the auto surveillance mode of the image information producing means 11, a luminance level monitoring section 143 for monitoring a luminance level of the video signal produced by the video signal producing means 12, and a motion judging section 145 for judging whether or not the motion of the object is fast in motion on the basis of the video signal produced by the video signal producing means 12.

The hardware configuration of the first preferred embodiment of the surveillance video camera 1 according to the present invention will be described hereinafter with reference to FIGS. 2a to 2c.

The image information producing means 11 of the surveillance video camera 1 includes a lens unit 61 having a light axis and an extension line extending in axial alignment with the light axis, an image sensor 62 to be positioned on the extension line of the lens unit 61, a first optical filter 63, i.e., an infrared light elimination filter, a second optical filter 64, i.e., a glass filter, and a switching mechanism 65.

The lens unit 61 has passed therethrough the light to be provided as an image to the image sensor 62, while the image sensor 62 is adapted to sense the image provided by the lens unit 62. The first optical filter 63 is operable to be provided between the lens unit 61 and the image sensor 62 to have passed therethrough the visible light to be projected to the image sensor 62. The second optical filter 64 is operable to be provided between the lens unit 61 and the image sensor 62 to have passed therethrough both the visible light and the infrared light which are collectively projected to the image sensor 62. The switching mechanism 65 is adapted to assume two different operation states including a first operation state to have the first optical filter 63 provided between the lens unit 61 and the image sensor 62 to have passed therethrough the visible light which is projected to the image sensor 62 without having the second optical filter 64 provided between the lens unit 61 and the image sensor 62, and a second operation state to have the second optical filter 64 provided between the lens unit 61 and the image sensor 62 to have passed therethrough both the visible light and the infrared light which are collectively projected to the image sensor 62 without having the first optical filter 63 provided between the lens unit 61 and the image sensor 62.

The sampling unit 66 is adapted to sample the image information produced by the image sensor 62 at a predetermined sampling rate, while the controlling unit 67 is adapted to control the exposure period of the image sensor 62 to readout the electric charge accumulated in the image sensor 62. The image device 62 and the sampling unit 66 can be collectively controlled by the controlling unit 67 to enhance the sensitivity of the converting section 112. The optical black level adjusting unit 68 is adapted to subtract the optical black signal produced by the optical black cell of the image sensor 62 from the electric signal produced by each of the pixel units of the image sensor 62 to maintain the optical black level without being affected by the dark current produced by the image sensor 62. The gain control unit 69 is adapted to adjust the gain of the output signal received from the optical black level adjusting unit 68 to output the adjusted output signal to the video signal producing means 12. The lens unit 61, the first and second optical filters 63 and 64, and the switching mechanism 65 collectively constitute an optical section 111, while the image sensor 62 and the sampling unit 66 collectively constitute a converting section 112.

Here, the switching mechanism 65 and the controlling unit 67 partially constitute at least two sensitivity enhancing units 113.

The image information producing means 11 is adapted to produce an electric signal indicative of the image information, while the electric signal produced by the image information producing means 11 is received by each of the color signal processing section 71 and the luminance signal processing section 72.

The color signal processing section 71 is adapted to produce a color difference signal indicative of the color information of the image taken by the image information producing means 11 through white valance, gamma correction, blanking, white clip, and other processes. The luminance signal processing section 72 is adapted to produce a luminance signal through the steps of eliminating a clock signal, a modulated color signal from the electric signal outputted from the image information producing means 11 by using a first low pass filter 73 (for color) and a second low pass filter 74 (for monochrome). The luminance processing unit 76 is adapted to the electric signal received from the first low pass filter 73 (for color) or the second low pass filter 74 and a gamma correction and a delay. The switching mechanism 75 is adapted to allow the output signal produced by the first low pass filter 73 to be received by the luminance processing unit 76 when the image is taken in color, and allow the second low pass filter 74 to be received by the luminance processing unit 76 when, on the other hand, the image is taken in monochrome.

The output signal producing means 13 includes a coding unit 81 for converting the video signal outputted from the video signal producing means 12 to an output signal to be received by a television set, a color burst signal superimposing unit 82, and a compression unit 83 for converting the video signal outputted from the video signal producing means 12 to an output signal to be received by a personal computer.

The luminance signal, the chroma signal, and the synchronizing signal collectively constitute a composite video signal.

The coding unit 81 is adapted to produce a composite video signal on the basis of the video signal produced by the video signal producing means 12, while the color burst signal superimposing unit 82 is adapted to superimpose the color burst signal on the horizontal synchronizing signal. The compression unit 83 is adapted to produce a compressed video signal to be distributed on the Internet, local area network, and other communication network.

Here, the term "output signal" is intended to indicate both the composite video signal and the compressed video signal.

The controlling means 14 include a microcomputer unit 93, an operation panel 91 to be operated by an operator to produce a command signal to be received by the microcomputer unit 93, and a display panel 92 for displaying on a screen the information about the operation condition of the surveillance video camera 1. The microcomputer unit 93 has bus lines 94, a central processing unit (hereinafter simply referred to as "CPU") 95, a memory unit 96, and first and second interface units 97 and 98. The CPU 95 and memory unit 96 are electrically connected to each other through the second interface unit 98. The memory unit 96 has stored therein a control program of controlling each of the image information producing means 11, the video signal producing means 11, the output signal producing means 13, and other parts of the surveillance video camera 1, while the CPU 52 is operate to execute the control program stored in the memory unit 96. The first interface unit 97 is electrically connected to the CPU 95, while the image information producing means 11, the video signal producing means 11, and the output signal producing means 13 is controlled by the CPU 95. The second interface unit 98 is electrically connected to each of the operation panel 91, the display panel 92, and outer communication network (not shown).

The following description will now be directed to both advantages and disadvantages of the first to third enhance modes of the image information producing means 11 of the surveillance video camera 1 according to the present invention.

(1) In the pixel synthesis mode, the pixel units of the converting section 112 are classified into a plurality of pixel groups, each of which is constituted by two or more pixel units adjacent to each other. When, for example, each of the pixel groups is constituted, as a picture element, by two pixel units adjacent to each other, each of pixel groups has a sensitivity twice as much as the sensitivity of each of the pixel units.

On the other hand, the more the number of the pixel units of each of the pixel groups is increased, the more the resolution of the image taken by the converting section 112 is dropped.

In the single image sensor type—surveillance video camera, the two or more pixel units adjacent to each other is designed to sense respective color components different to each other. This means that the image information is deteriorated by reason that the color components sensed by the pixel units of each of the pixel groups are mixed with each other in the pixel synthesis mode.

It's preferred that the image is taken in monochrome in the pixel synthesis mode to avoid the mixture of the color components in the single image sensor type—surveillance video camera.

(2) In the long exposure mode, the sensitivity of the converting section 112 is increased in proportional relationship with the extended exposure period.

On the other hand, the resolution of the images to the motion of the object is deteriorated by reason that the field number of the images to be taken per unit time are decreased in the long exposure mode.

(3) In the infrared addition mode, the sensitivity of the converting section 112 is enhanced by reason that the converting section 112 is exposed by not only the visible light but also the infrared light. The resolution of the image taken by the converting section 112 can be maintained without being dropped.

It's preferred that the image is taken in monochrome in the infrared addition mode to avoid the change of the color balance in the infrared addition mode.

In reduced illumination, the surveillance video camera can selectively assume the above mentioned sensitivity enhancing modes to enhance the sensitivity of the converting section 112.

As shown in FIG. 4, each of the sensitivity enhancing modes has advantages and disadvantages. It is, therefore, preferred that the long exposure mode, the infrared addition mode, and the pixel synthesis mode are started in order of the infrared addition mode, the pixel synthesis mode, and the long exposure mode when the motion of the object to be watched is given priority over the resolution of the image, and, on the other hand, started in order of the long exposure mode, the infrared addition mode, and the pixel synthesis mode when the resolution of the image is given priority over the motion of the object to be watched.

The surveillance video camera 1 according to the present invention is adapted to take an image in the reduced illumination by allowing each of the first to third sensitivity enhancing units 113 to start enhance the sensitivity of the converting sections 112 in order of the infrared addition mode, the pixel synthesis mode, and the long exposure mode when the motion of the object to be watched is given priority over the resolution of the image. The surveillance video camera 1 according to the present invention is adapted to take an image in the reduced illumination by allowing each of the first to third sensitivity enhancing units 113 to start enhance the sensitivity of the converting sections 112 in order of the long exposure mode, the infrared addition mode, and the pixel synthesis mode when the resolution of the image is given priority over the motion of the object to be watched.

Figure 5:
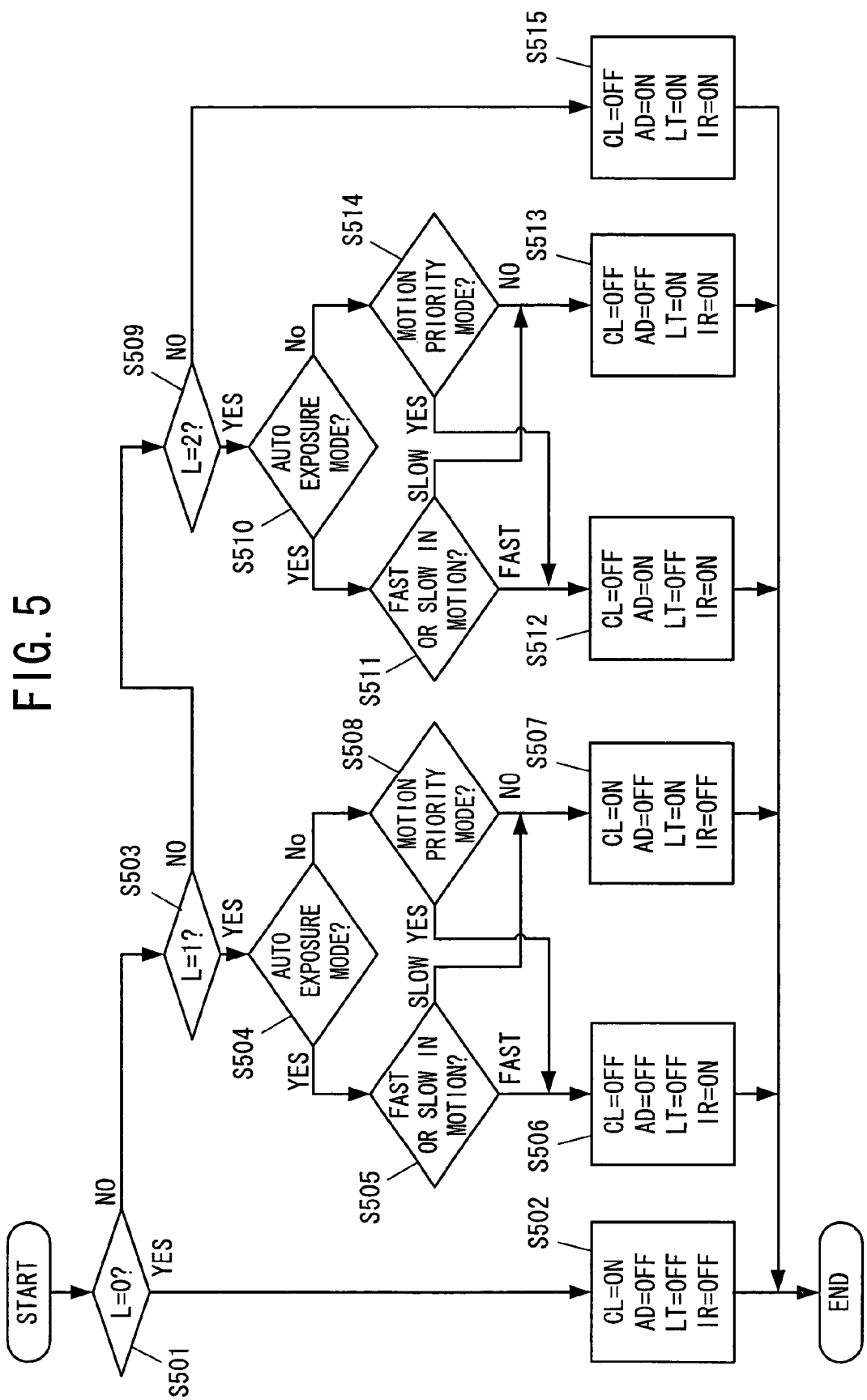
FIG. 5 is a flow chart showing the operation of the first preferred embodiment of the surveillance video camera according to the present invention.

The operation of the executing section 141 of the controlling means 14 will be described hereinafter with reference to FIG. 5.

The executing section 141 is firstly operated to judge whether or not the illumination level "L" of the object is equal to the level "0" in the step S501. When the answer in the step S501 is in the affirmative "YES", i.e., the illumination level "L" of the object is equal to the level "0", the step 501 proceeds to the step 502. The executing section 141 is then operated to turn on the first control flag "CL", and to turn off each of the second control flag "AD" of the pixel synthesis mode, the third control flag "LT" of the long exposure mode, and the fourth control flag "IR" of the infrared addition mode to ensure that the image is taken in color by the image information producing means 11 in the step 502.

The microcomputer unit 93 is then operated to produce a "ON" signal of the first control flag "CL" to be outputted to the image information producing means 11 through the interface unit 97. The image is then taken by the image information producing means 11 under the following conditions in the step S502.

(1) The first low pass filter 73 is electrically connected to the luminance processing unit 76 through the switching unit 75.

(2) The color burst signal is superimposed by the color burst signal superimposing unit 82 on a back porch of a horizontal synchronizing signal.

(3) The compressed signal is produced by the compressed signal producing unit 83 on the basis of the method suitable of the compression of the color video signal.

The "ON" signal of the fourth control flag "IR" of the infrared addition mode is then produced by the microcomputer unit 93 to be outputted to the switching mechanism 65 through the interface unit 97. The controlling unit 67 is then operated to control each of the image device 62 and the sampling unit 66 to fail to enhance the sensitivity of the converting section 112 in the long exposure mode. This means that the image is taken in normal mode.

The "OFF" signal of the fourth control flag "IR" of the infrared addition mode is then produced by the microcomputer unit 93 to be outputted to the switching mechanism 65 through the interface unit 97. The switching mechanism 65 is then operated to drive the first optical filter 63 to allow the first optical filter 63 to be provided between the lens unit 61 and the image sensor 62 to ensure that the visible light passed by the first optical filter 63 is sensed by the image sensor 62.

When, on the other hand, the answer in the step S501 is in the negative "NO", i.e., the illumination level "L" of the object is not equal to level "0", the judgment is made by the executing section 141 on whether or not the illumination level "L" of the object is equal to level "1" in the step S503.

When the answer in the step S503 is in the affirmative "YES", i.e., the illumination level "L" of the object is equal to level "1", the judgment is made by the executing section 141 on whether or not the auto mode is being taken by the image information producing means 11 in the step S504.

When the answer in the step S504 is in the affirmative "YES", i.e., the auto mode is being taken by the image information producing means 11, the judgment is made by the motion judging section 145 on whether or not the object is fast in action in comparison with the predetermined threshold level on the basis of the image information produced by the image information producing means 11 in the step S505.

When the answer in the step S505 is in the affirmative "YES", i.e., the object is fast in action, the executing section 141 is operated to turn on the fourth control flag "IR" of the infrared addition mode, and to turn off each of the first control flag "CL", the second control flag "AD" of the pixel synthesis mode, and the third control flag "LT" of the long exposure mode in the step S506.

The "OFF" signal of the first control flag "CL" is then produced by the microcomputer unit 93 to be outputted to the image information producing means 11 through the interface unit 97. The image is then taken in monochrome by the image information producing means 11 under the following conditions.

(1) The second low pass filter 74 is electrically connected to the luminance processing unit 76 through the switching unit 75.

(2) The color burst signal is not superimposed by the color burst signal superimposing unit 82 on a back porch of a horizontal synchronizing signal.

(3) The compressed signal is produced by the compressed signal producing unit 83 on the basis of the method suitable of the compression of the monochrome video signal.

The "ON" signal of the fourth control flag "IR" of the infrared addition mode is then produced by the microcomputer unit 93 to be outputted to the switching mechanism 65 through the interface unit 97. The switching mechanism 65 is then operated to drive the second optical filter 64 to allow the second optical filter 64 to be provided between the lens unit 61 and the image sensor 62 to ensure that both the visible light and the infrared light passed by the second optical filter 64 is sensed by the image sensor 62. This means that the sensitivity of the image sensor 62 is enhanced by reason that both the visible light and the infrared light are sensed by the image sensor 62.

Here, the second control flag "AD" of the pixel synthesis mode and the third control flag "LT" of the long exposure mode are respectively kept in "OFF" and "OFF" states. This means that the pixel synthesis mode and the long exposure mode are not performed by the image information producing means 11.

When, on the other hand, the answer in the step S505 is in the negative "NO", i.e., the object is not fast in action, the executing section 141 is operated to turn on the third control flag "LT" of the long exposure mode in the step S507.

The "ON" signal of the third control flag "LT" of the long exposure mode is then produced by the microcomputer unit 93 to be outputted to the controlling unit 67 through the interface unit 97. The controlling unit 67 is then operated to control each of the image device 62 and the sampling unit 66 to enhance the sensitivity of the converting section 112 in the long exposure mode. This means that the electrical charge to be accumulated in each cells of the image sensor 62 over the extended exposure period is increased in comparison with the electrical charge to be accumulated in each cells of the image sensor 62 over the exposure period.

Here, the first control flag "CL", the second control flag "AD" of the pixel synthesis mode and the fourth control flag "IR" of the infrared addition mode are respectively kept in "ON", "OFF", and "OFF" states. This means that the pixel synthesis mode and the infrared addition mode are not performed by the image information producing means 11.

When, on the other hand, the answer in the step S504 is in the negative "NO", i.e., the auto mode is not being taken by the image information producing means 11, the judgment is made by the executing section 141 on whether or not the motion priority mode is being taken by the image information producing means 11 in the step S508.

When the answer in the step S508 is in the affirmative "YES", i.e., the motion priority mode is being taken by the image information producing means 11, the step 508 proceeds to the step 506. When, on the other hand, the answer in the step S508 is in the negative "NO", i.e., the resolution priority mode is being taken by the image information producing means 11, the step 508 proceeds to the step 507.

When, on the other hand, the answer in the step S503 is in the negative "NO", i.e., the illumination level "L" of the object is not equal to level "1", the judgment is made by the executing section 141 on whether or not the illumination level "L" of the object is equal to "2" in the step S509.

When the answer in the step S509 is in the affirmative "YES", i.e., the illumination level "L" of the object is equal to "2", the judgment is made by the executing section 141 on whether or not the auto mode is being taken by the image information producing means 11 in the step S510.

When the answer in the step S510 is in the affirmative "YES", i.e., the auto mode is being taken by the image information producing means 11, the judgment is made by the motion judging section 145 for judging whether or not the object is fast in action in comparison with the predetermined threshold level on the basis of the image information produced by the image information producing means 11 in the step S511.

When the answer in the step S511 is in the affirmative "YES", i.e., the object is fast in action, the executing section 141.is operated to turn on each of the second control flag "AD" of the pixel synthesis mode and the fourth control flag "IR" of the infrared addition mode, and to turn off each of the first control flag "CL" and the third control flag "LT" of the long exposure mode in the step S512.

The "OFF" signal of the first control flag "CL" is then produced by the microcomputer unit 93 to be outputted to the image information producing means 11 through the interface unit 97. The image is then taken in monochrome by the image information producing means 11 under the following conditions.

(1) The second low pass filter 74 is electrically connected to the luminance processing unit 76 through the switching unit 75.

(2) The color burst signal is not superimposed by the color burst signal superimposing unit 82 on a back porch of a horizontal synchronizing signal.

(3) The compressed signal is produced by the compressed signal producing unit 83 on the basis of the method suitable of the compression of the monochrome video signal.

The "ON" signal of the second control flag "AD" of the pixel synthesis mode is then produced by the microcomputer unit 93 to be outputted to the controlling unit 67 through the interface unit 97. The controlling unit 67 is then operated to control each of the image device 62 and the sampling unit 66 to enhance the sensitivity of the converting section 112 in the pixel synthesis mode. This means that the electrical charge to be accumulated in one pixel group of the image sensor 62 over the extended exposure period, and to be outputted as one pixel information is increased in comparison with the electrical charge to be accumulated in one cell of the image sensor 62 over the exposure period.

Here, the third control flag "LT" of the long exposure mode and the fourth control flag "IR" of the infrared addition mode are respectively kept in "OFF" and "OFF" states. This means that the long exposure mode and the infrared addition mode are not performed by the image information producing means 11.

When, on the other hand, the answer in the step S511 is in the negative "NO", i.e., the object is not fast in action, the executing section 141 is operated to turn on each of the third control flag "LT" of the long exposure mode and the fourth control flag "IR" of the infrared addition mode, and to turn off each of the first control flag "CL" and the second control flag "AD" of the pixel synthesis mode in the step S513.

The "OFF" signal of the first control flag "CL" is then produced by the microcomputer unit 93 to be outputted to the image information producing means 11 through the interface unit 97. The image is then taken in monochrome by the image information producing means 11 under the following conditions.

(1) The second low pass filter 74 is electrically connected to the luminance processing unit 76 through the switching unit 75.

(2) The color burst signal is not superimposed on a back porch of a horizontal synchronizing signal by the color burst signal superimposing unit 82.

(3) The compressed signal is produced by the compressed signal producing unit 83 on the basis of the method suitable of the compression of the monochrome video signal.

The "ON" signal of the fourth control flag "IR" of the infrared addition mode is then produced by the microcomputer unit 93 to be outputted to the switching mechanism 65 through the interface unit 97. The switching mechanism 65 is then operated to drive the second optical filter 64 to allow the second optical filter 64 to be provided between the lens unit 61 and the image sensor 62 to ensure that both the visible light and the infrared light passed by the second optical filter 64 is sensed by the image sensor 62. This means that the sensitivity of the image sensor 62 is enhanced by reason that both the visible light and the infrared light are sensed by the image sensor 62.

Here, the third control flag "LT" of the long exposure mode and the second control flag "AD" of the pixel synthesis mode are kept in "OFF" and "ON" states. This means that the long exposure mode is not performed by the image information producing means 11.

When, on the other hand, the answer in the step S509 is in the negative "NO", i.e., the auto mode is not being taken by the image information producing means 11, the judgment is made by the executing section 141 on whether or not the motion priority mode is being taken by the image information producing means 11 in the step S514.

When the answer in the step S514 is in the affirmative "YES", i.e., the motion priority mode is being taken by the image information producing means 11, the step 514 proceeds to the step 512. When, on the other hand, the answer in the step S514 is in the negative "NO", i.e., the resolution priority mode is being taken by the image information producing means 11, the step 514 proceeds to the step 513.

When, on the other hand, the answer in the step S509 is in the negative "NO", i.e., the illumination level "L" of the object is equal to "3", the executing section 141 is operated to turn on each of the second control flag "AD" of the pixel synthesis mode, the third control flag "LT" of the long exposure mode, and the fourth control flag "IR" of the infrared addition mode, and to turn off the first control flag "CL" in the step S515.

The "OFF" signal of the first control flag "CL" and the "ON" signal of each of the second control flag "AD" of the pixel synthesis mode, the third control flag "LT" of the long exposure mode, and the fourth control flag "IR" of the infrared addition mode are then produced by the microcomputer unit 93 to be outputted to the image information producing means 11 through the interface unit 97. The image is then taken in monochrome by the image information producing means 11 under the following conditions.

(1) The second low pass filter 74 is electrically connected to the luminance processing unit 76 through the switching unit 75.

(2) The color burst signal is not superimposed on a back porch of a horizontal synchronizing signal by the color burst signal superimposing unit 82.

(3) The compressed signal is produced by the compressed signal producing unit 83 on the basis of the method suitable of the compression of the monochrome video signal.

Figure 6:
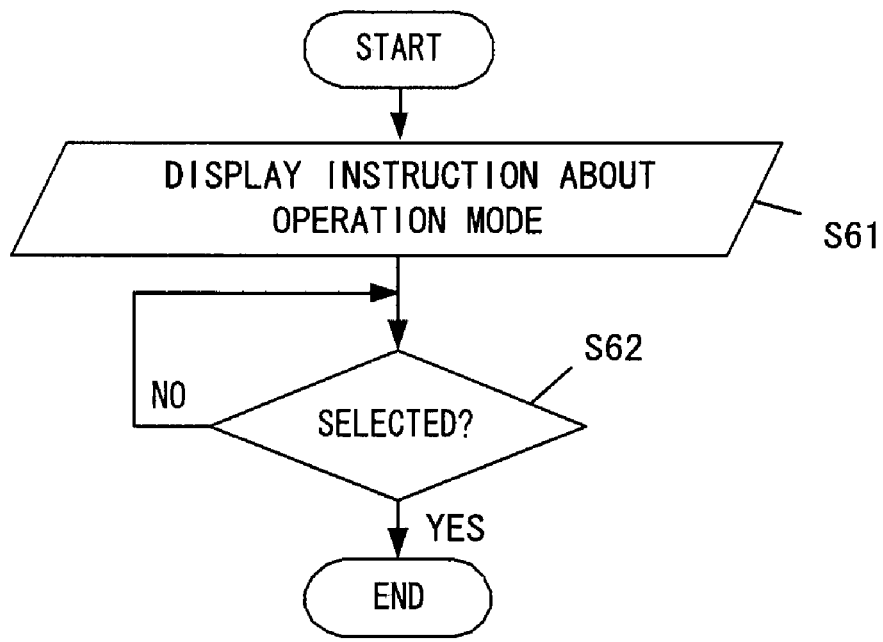
FIG. 6 is a flow chart showing the mode selecting operation of the first preferred embodiment of the surveillance video camera according to the present invention.

The operation of the surveillance mode selecting section 142 of the controlling means 14 will be described hereinafter with reference to FIG. 6.

The surveillance mode selecting section 142 is firstly operated to display on the display panel 92 the information about the setup instruction of the surveillance modes to be selectively assumed by the surveillance video camera 1 in the step S61.

Figure 7:
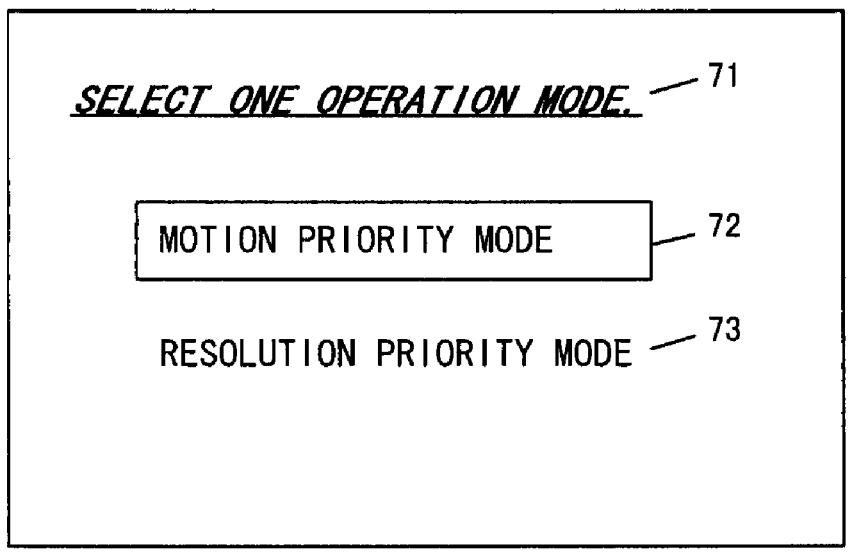
FIG. 7 is a flow chart showing the information displayed on a screen of the display panel of the first preferred embodiment of the surveillance video camera according to the present invention.

FIG. 7 is a schematic view showing one typical example of the information about the setup instruction of the surveillance modes to be selectively assumed by the surveillance video camera 1. As shown in FIG. 7, the motion priority mode and the resolution priority mode are selectively assumed by the surveillance video camera 1.

Here, the display panel 92 and the operation panel 91 correctively constitute a touch screen under the condition that the display panel 92 and the operation panel 91 are positioned in face-to-face relationship with each other.

The judgment is then made by the surveillance mode selecting section 142 on whether or not any one of the motion priority mode and the resolution priority mode is requested by an operator through the touch screen in the step S62. When the answer in the step S62 is in the affirmative "YES", i.e., any one of the motion priority mode and the resolution priority mode is requested by an operator, the requested priority mode is recognized by the surveillance mode selecting section 142 as a mode to be assumed by the surveillance video camera 1.

In the embodiment, the motion priority mode and the resolution priority mode are selectively assumed by the surveillance video camera 1. However, the motion priority mode, the resolution priority mode, and the auto mode may be selectively assumed by the surveillance video camera 1.

Figure 8:
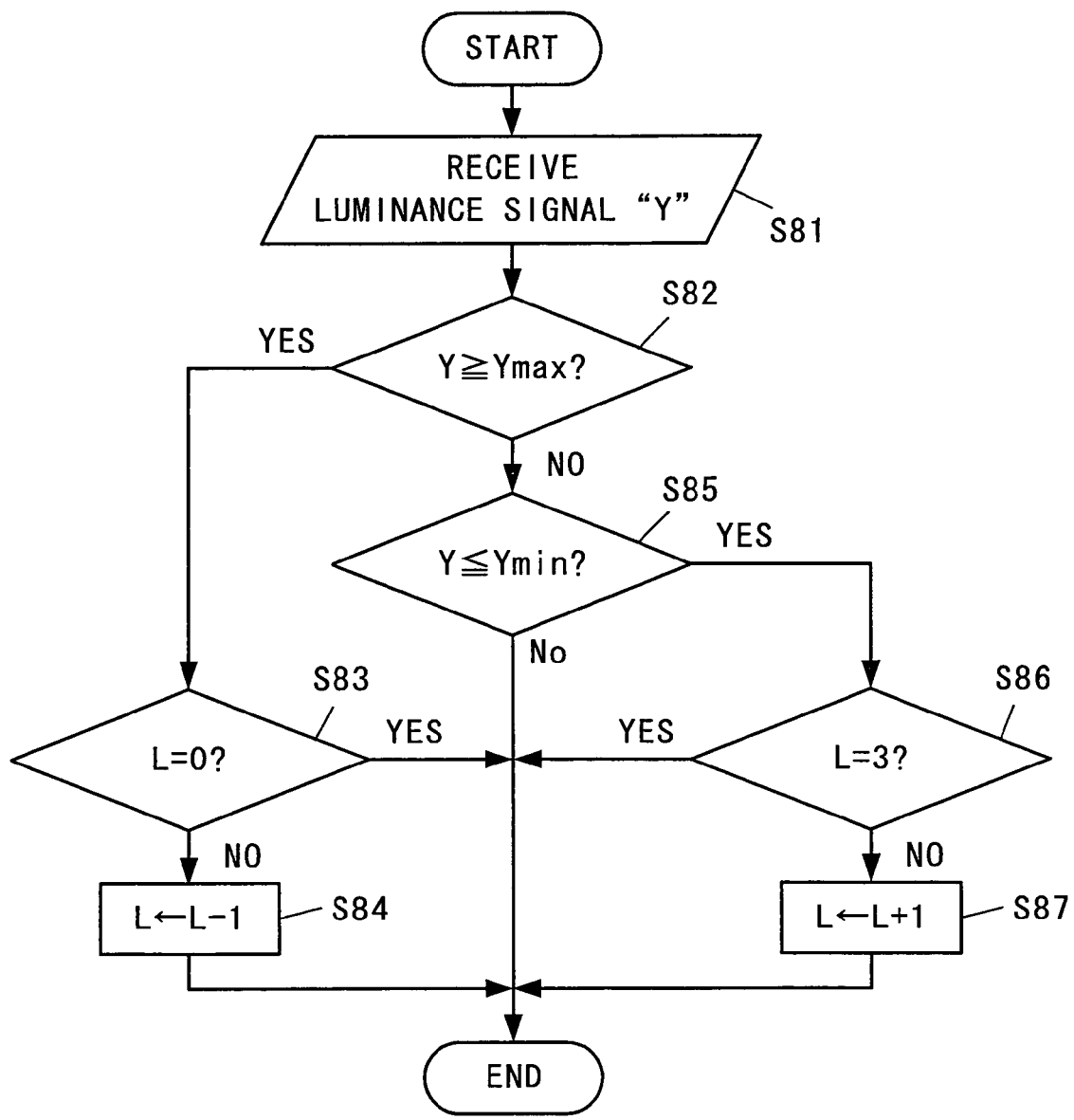
FIG. 8 is a flow chart showing the luminance level monitoring operation of the first preferred embodiment of the surveillance video camera according to the present invention.
Figure 9:
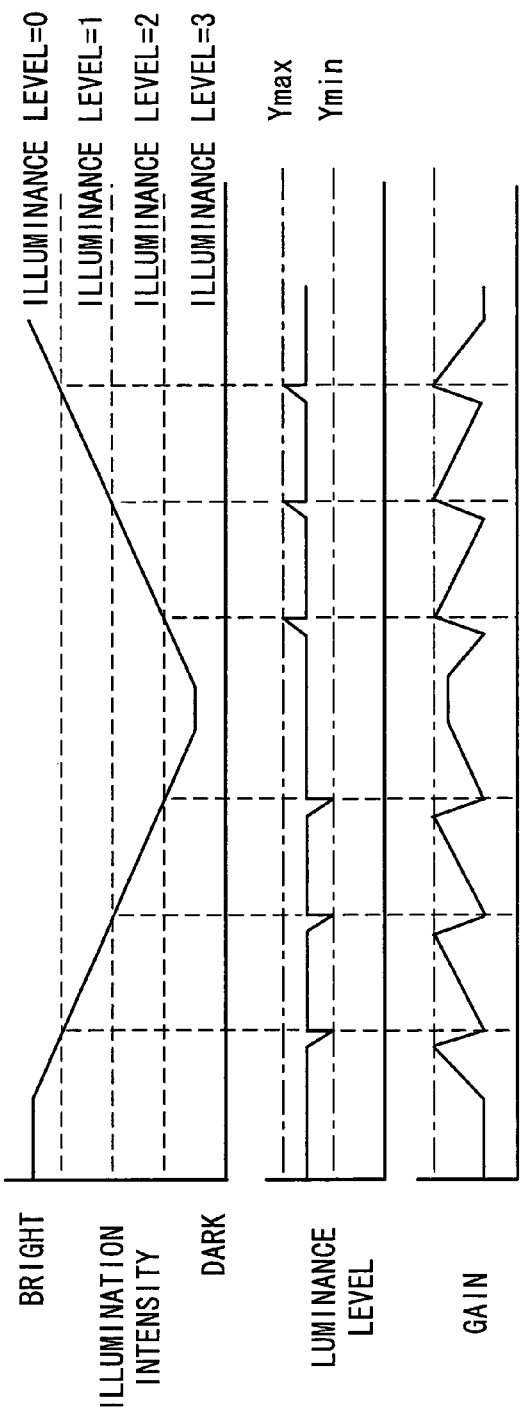
FIG. 9A is a graph showing a variation in illumination intensity in each of the surveillance modes to be assumed by the surveillance video camera.
FIG. 9B is a graph showing a variation in luminance in each of the surveillance modes to be assumed by the surveillance video camera in response to the illumination intensity shown in FIG. 9A.
FIG. 9C is a graph showing a variation in gain in each of the surveillance modes to be assumed by the surveillance video camera in response to the illumination intensity shown in FIG. 9A.
FIG. 9D is a descriptive diagram showing the motion priority mode to be assumed by the surveillance video camera.
FIG. 9E is a descriptive diagram showing the resolution priority mode to be assumed by the surveillance video camera.

The operation of the illumination level monitoring section 143 will be described hereinafter with reference to FIG. 8.

The illumination level monitoring section 143 is firstly operated to receive the luminance signal "Y" from the luminance processing unit 76 in the step S81. The judgment is then made by the illumination level monitoring section 143 on whether or not the level of the luminance signal "Y" is equal to or larger than a predetermined maximum level "Ymax" in the step S82. When the answer in the step S82 is in the affirmative "YES", i.e., the level of the luminance signal "Y" is equal to or larger than the predetermined maximum level "Ymax", the step S82 proceeds to the step S83. The judgment is then made by the illumination level monitoring section 143 on whether or not the current illumination level of the object is equal to the level "0" in the step S83.

When the answer in the step S83 is in the affirmative "YES", i.e., the current illumination level of the object is equal to the level "0", the current illumination level of the object is not decremented by the illumination level monitoring section 143. When, on the other hand, the answer in the step S83 is in the negative "NO", i.e., the current illumination level of the object is not equal to the level "0", the step S83 proceeds to the step S84. The current illumination level of the object is decremented by the illumination level monitoring section 143 in the step S84.

When, on the other hand, the answer in the step S82 is in the negative "NO", i.e., the level of the luminance signal "Y" is smaller than the predetermined maximum level "Ymax", the step S82 proceeds to the step S83. The judgment is then made by the illumination level monitoring section 143 on whether or not the level of the luminance signal "Y" is equal to or smaller than a predetermined minimum level "Ymin" in the step S85.

When the answer in the step S85 is in the affirmative "YES", i.e., the level of the luminance signal "Y" is equal to or smaller than the predetermined minimum level "Ymin", the step S85 proceeds to the step S86. The judgment is then made by the illumination level monitoring section 143 on whether or not the current illumination level of the object is equal to the level "3" in the step S86.

When the answer in the step S86 is in the affirmative "YES", i.e., the current illumination level of the object is equal to the level "3", the current illumination level of the object is not incremented by the illumination level monitoring section 143. When, on the other hand, the answer in the step S86 is in the negative "NO", i.e., the current illumination level of the object is not equal to the level "3", the current illumination level of the object is incremented by the illumination level monitoring section 143 in order to attain the sensitivity enhancement in the step S87.

When, on the other hand, the answer in the step S85 is in the negative "NO", i.e., the level of the luminance signal "Y" is larger than the predetermined minimum level "Ymin", the current illumination level of the object is not incremented by the illumination level monitoring section 143.

The following description will be directed to the operation of the first preferred embodiment of the surveillance video camera according to the present invention.

FIG. 9A is a graph showing a variation in illumination intensity in each of the surveillance modes to be assumed by the surveillance video camera. FIG. 9B is a graph showing a variation in luminance in each of the surveillance modes to be assumed by the surveillance video camera in response to the illumination intensity shown in FIG. 9A. FIG. 9C is a graph showing a variation in gain in each of the surveillance modes to be assumed by the surveillance video camera in response to the illumination intensity shown in FIG. 9A. FIG. 9D is a descriptive diagram showing the motion priority mode to be assumed by the surveillance video camera. FIG. 9E is a descriptive diagram showing the resolution priority mode to be assumed by the surveillance video camera.

If the illumination intensity is within the range to be adjusted by the gain control unit 69, the luminance level "Y" is kept at a constant level.

When the judgment is made that the level of the luminance signal "Y" is smaller than a predetermined minimum level "Ymin" under the condition that the gain of the gain control unit 69 is within the range of maximum level, the luminance level is recognized as a level "1" by the illumination level monitoring section 143.

The sensitivity of the converting section 112 is enhanced by turning on the fourth control flag "IR" of the infrared addition mode, while both the infrared light and the visible light are provided to the converting section 112 on the basis of the fourth control flag "IR" of the infrared addition mode. Here, the image is taken in monochrome by the converting section 112.

The executing section 141 is then operated to turn on the first control flag "CL", and to turn off each of the second control flag "AD" of the pixel synthesis mode, the third control flag "LT" of the long exposure mode, and the fourth control flag "IR" of the infrared addition mode to ensure that the image is taken in color by the image information producing means 11.

In the resolution priority mode, the decrease of the illumination intensity leads to the fact that the sensitivity of the converting section 112 is sequentially enhanced by turning on the second control flag "AD" of the pixel synthesis mode, the third control flag "LT" of the long exposure mode, and the fourth control flag "IR" of the infrared addition mode in order of the third control flag "LT", the fourth control flag "IR", and the second control flag "AD". On the other hand, the increase of the illumination intensity leads to the fact that the sensitivity of the converting section 112 is sequentially reduced by turning off the second control flag "AD" of the pixel synthesis mode, the third control flag "LT" of the long exposure mode, and the fourth control flag "IR" of the infrared addition mode in order of the second control flag "AD", the fourth control flag "IR", and the third control flag "LT".

When the judgment is made by the motion judging section 145 that the motion of the object is fast on the basis of the compressed video signal produced by the compression unit 83 in the auto mode, the surveillance video camera 1 is operated to assume the motion priority mode. When, on the other hand, the judgment is made by the motion judging section 145 that the motion of the object is slow on the basis of the compressed video signal produced by the compression unit 83 in the auto mode, the surveillance video camera 1 is operated to assume the resolution priority mode.

From the above detailed description, it will be understood that the surveillance video camera can optically switch the sensitivity of the converting section 112 in a phased manner in accordance with the decrease or the increase of the illumination intensity by selectively switching the sensitivity enhancing modes, i.e., the long exposure mode, the infrared addition mode, and the pixel synthesis mode.

In this embodiment, the executing section 141 is adapted to selectively take the long exposure mode, the infrared addition mode, and the pixel synthesis mode in a phased manner in accordance with the decrease or the increase of the illumination intensity. However, the executing section 141 may be adapted to selectively take the long exposure mode and the pixel synthesis mode in a phased manner in accordance with the decrease or the increase of the illumination intensity.

In this case, the sensitivity of the converting section 112 may be enhanced in a phased manner by selectively taking the long exposure mode and the pixel synthesis mode in order of the pixel synthesis mode and the pixel synthesis mode in the motion priority mode.

From the above detail description, it will be understood that the surveillance video camera can take images optimally without being affected by the fluctuation of the illumination intensity by reason that the image information producing means 11 includes two or more sensitivity enhancing unit 113 each for enhancing the sensitivity of the converting section 112, and the controlling means 14 includes an executing section 141 for allowing the sensitivity enhancing unit 113 to start in a predetermined sequence to enhance the sensitivity of the converting section 112 in accordance with the decrease of the illumination intensity, and to stop in an inverse order of the predetermined sequence enhancing the sensitivity of the converting section 112 in accordance with the increase of the illumination intensity.

Although there has been described in the above about the first preferred embodiment of the surveillance video camera according to the present invention, this embodiment may be replaced by the second referred embodiment of the surveillance video camera according to the present invention in order to attain the objects of the present invention. The second preferred embodiment of the surveillance video camera will be described hereinafter.

Referring now to FIGS. 10 to 15 of the drawings, there is shown a second preferred embodiment of the surveillance video camera.

The constitutional elements and the steps of the second preferred embodiment of the surveillance video camera according to the present invention as shown in FIGS. 1 is entirely the same as those of the first preferred embodiment of the surveillance video camera according to the present invention as shown in FIG. 1 except for the constitutional elements and the steps appearing in the following description. Therefore, only the constitutional elements and the steps of the second preferred embodiment of the surveillance video camera different from those of the first preferred embodiment of the surveillance video camera will be described in detail hereinafter. The constitutional elements and the steps of the second preferred embodiment of the surveillance video camera entirely the same as those of the first preferred embodiment of the surveillance video camera will not be described but bear the same reference numerals and legends as those of the first preferred embodiment of the surveillance video camera in FIG. 1 to avoid tedious repetition.

In general, the optical black level and the luminance level of the electric signal produced by the converting section 112 are disturbed by enhancing the sensitivity of the converting section 112.

The following description will be directed to the second preferred embodiment of the surveillance video camera which can take an image of an object at relatively high quality while preventing the optical black level and the luminance level from being disturbed by enhancing the sensitivity of the converting section 112.

Figure 10:
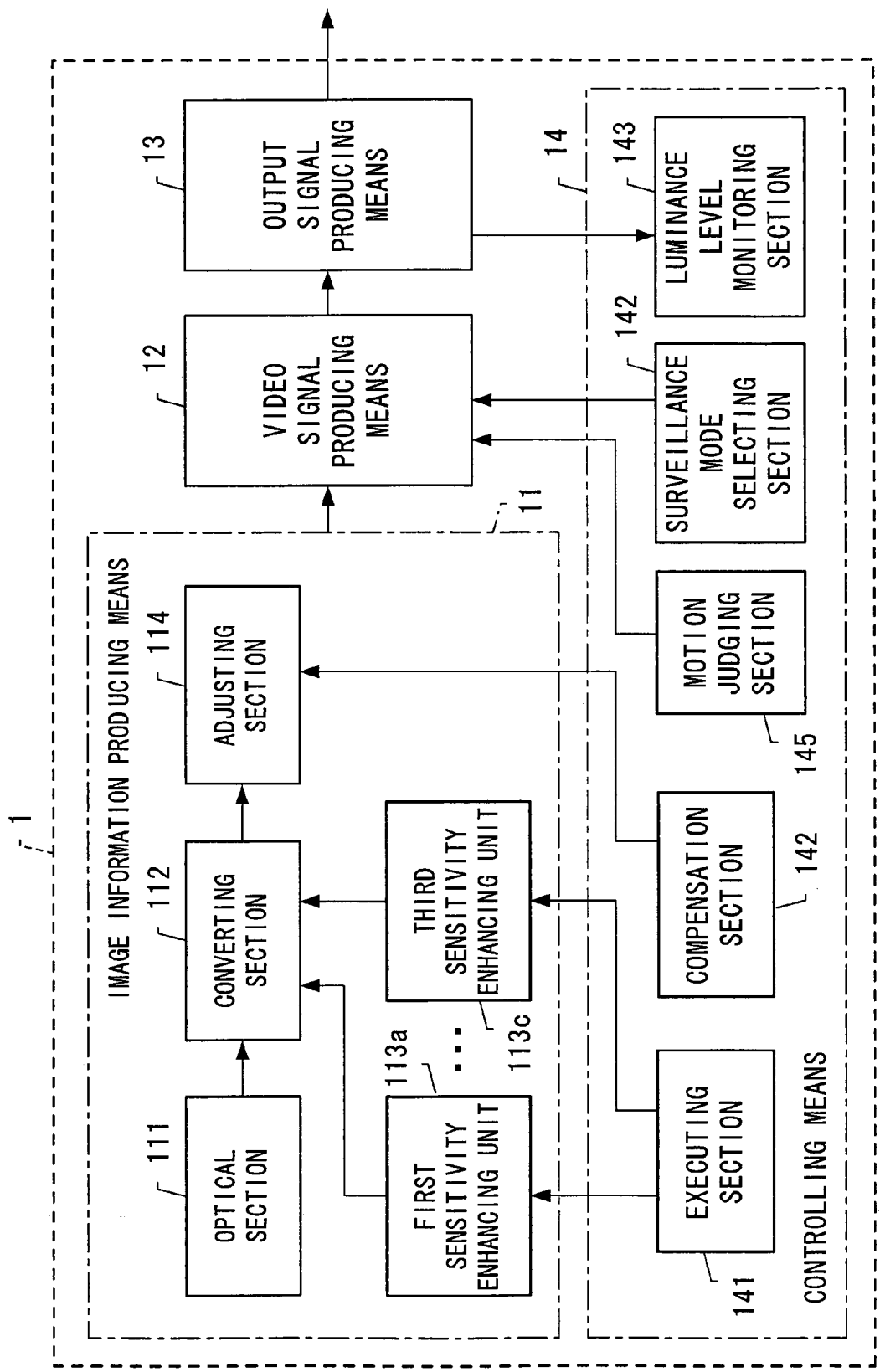
FIG. 10 is a block diagram of the first preferred embodiment of the surveillance video camera according to the present invention.

In this embodiment of the surveillance video camera according to the present invention, the image information producing means 11 is shown in FIG. 10 as including the optical section 111, the converting section 112, and the sensitivity enhancing unit 113a to 113c, all of which are the same in construction as the image information producing means 11 of the first preferred embodiment of the surveillance video camera shown in FIG. 1 and thus its construction will not be described in detail hereinafter. The image information producing means 11 further includes an adjusting section 114 for adjusting the optical black level and the luminance level of the electric signal produced by the converting section 112.

The controlling means 14 is shown in FIG. 10 as including the executing section 141, the motion judging section 145, the surveillance mode selecting section 142, and the luminance signal monitoring section 143, all of which are the same in construction as the controlling means 14 of the first preferred embodiment of the surveillance video camera shown in FIG. 1 and thus its construction will not be described in detail hereinafter. The controlling means 14 further includes a compensation section 144 for compensate the optical black level and the luminance level to be adjusted by the adjusting section 114 when each of the sensitivity enhancing units 113 is operated to start to enhance, and to stop enhancing the sensitivity of the converting section 112.

Figure 2C:
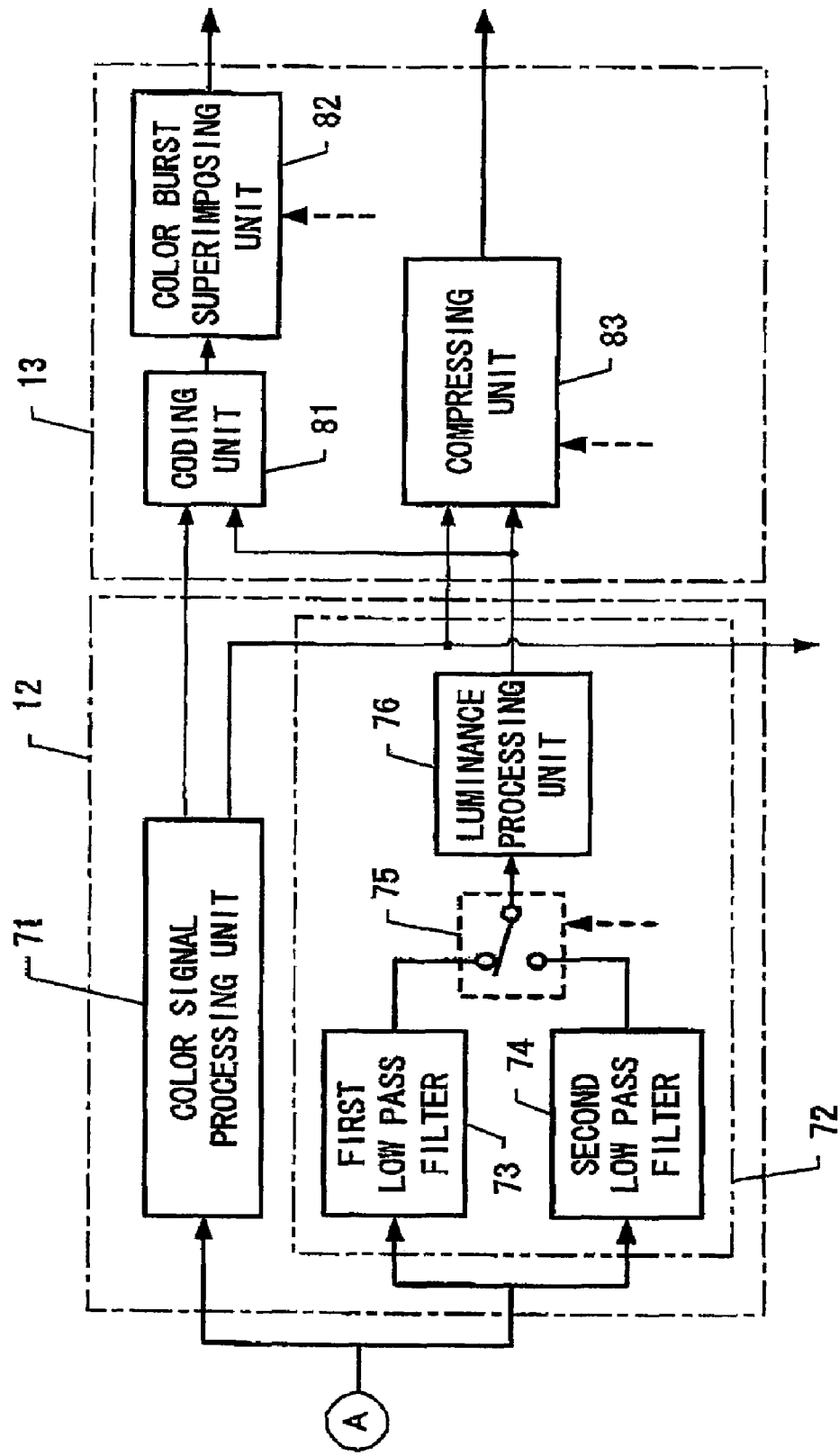

As shown in FIGS. 2a to 2c, the adjusting section 114 includes an optical black level adjusting unit 68, and a gain adjusting unit 69. The microcomputer unit 93 has a compensation program installed therein to compensate, as a compensation section 144, the optical black level and the luminance level of the electric signal produced by the converting section 112.

Figure 11:
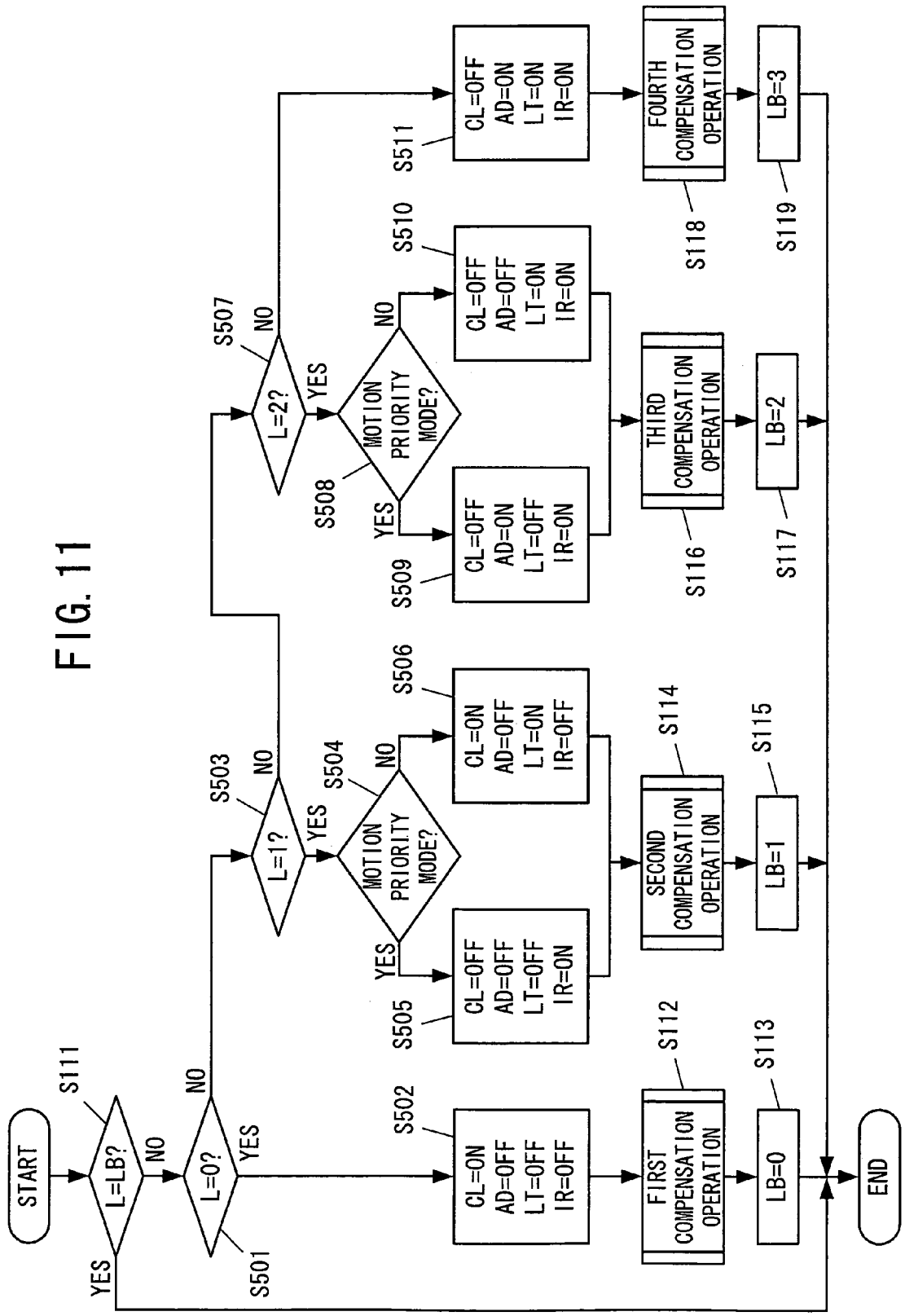
FIG. 11 is a flow chart showing the operation of the first preferred embodiment of the surveillance video camera according to the present invention.

The operation of the executing section 141 of the second preferred embodiment of the surveillance video camera according to the present invention will be described hereinafter with reference to FIG. 11. The steps of the second preferred embodiment of the surveillance video camera entirely the same as those of the first preferred embodiment of the surveillance video camera will not be described but bear the same reference numerals as those of the first preferred embodiment of the surveillance video camera.

The executing section 141 is firstly operated to judge whether or not the current illumination level "L" of the object is equal to the last illumination level "LB" of the object in the step S111. When the answer in the step S111 is in the affirmative "YES", i.e., the current illumination level "L" of the object is equal to the last illumination level "LB", the step S111 proceeds to the end of the operation of the executing section 141. When, on the other hand, the answer in the step S111 is in the negative "NO", i.e., the current illumination level "L" of the object is not equal to the last illumination level "LB", the step S111 proceeds to the step 501. The judgment is made by the executing section 141 on whether or not the current illumination level "L" of the object is equal to the level "0" in the step S501.

When the answer in the step S501 is in the affirmative "YES", i.e., the current illumination level "L" of the object is equal to the level "0", the step 501 proceeds to the step 502. The executing section 141 is then operated to turn on the first control flag "CL", and to turn off each of the second control flag "AD" of the pixel synthesis mode, the third control flag "LT" of the long exposure mode, and the fourth control flag "IR" of the infrared addition mode in the step 502. The step S502 proceeds to the step S113 through the first compensation step S112. The current illumination level "L", i.e., the level "0" is then stored as a last illumination level "LB" by the executing section 141 in the step S113. When, on the other hand, the answer in the step S501 is in the negative "NO", i.e., the current illumination level "L" of the object is not equal to the level "0", the judgment is made by the executing section 141 on whether or not the current illumination level "L" of the object is equal to the level "1" in the step S503.

When the answer in the step S503 is in the affirmative "YES", i.e., the current illumination level "L" of the object is equal to the level "1", the step S503 proceeds to the step S115 through the steps S504, S505, S506, and the second compensation step S114. The current illumination level "L", i.e., the level "1" is then stored as a last illumination level "LB" by the executing section 141 in the step S115. When, on the other hand, the answer in the step S503 is in the negative "NO", i.e., the current illumination level "L" of the object is not equal to the level "1", the judgment is made by the executing section 141 on whether or not the current illumination level "L" of the object is equal to the level "2" in the step S507.

When the answer in the step S507 is in the affirmative "YES", i.e., the current illumination level "L" of the object is equal to the level "2", the step S507 proceeds to the step S117 through the steps S508, S509, S510, and the third compensation step S116. The current illumination level "L", i.e., the level "2" is then stored as a last illumination level "LB" by the executing section 141 in the step S117. When, on the other hand, the answer in the step S507 is in the negative "NO", i.e., the current illumination level "L" of the object is not equal to the level "2", the step 507 proceeds to the step 119 through the steps S511 and the fourth compensation step S118.

Figure 12:
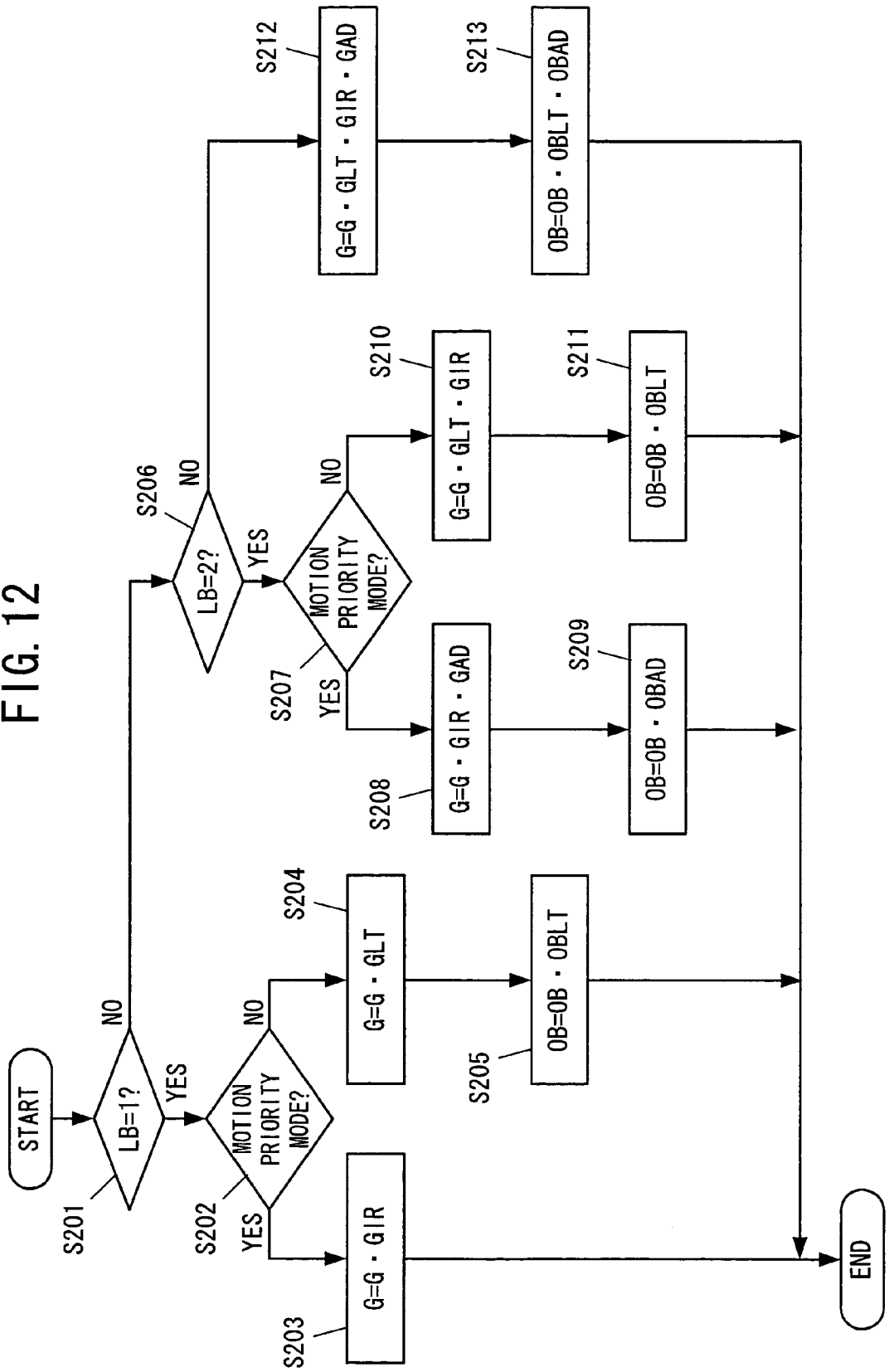
FIG. 12 is a flow chart showing a first compensation step to be executed by the compensation section of the controlling means of the first preferred embodiment of the surveillance video camera according to the present invention.

The first compensation step S112 will be described in detail hereinafter with reference to FIG. 12.

In the first compensation step S112, the compensation section 144 is firstly operated to judge whether or not the last illumination level "LB" of the object is equal to the level "1" in the step S201.

When the answer in the step S201 is in the affirmative "YES", i.e., the last illumination level "LB" of the object is equal to the level "1", the step S201 proceeds to the step S202. The judgment is then made by the compensation section 144 on whether or not the motion priority mode is currently taken as a surveillance mode by the image information producing means 11 in the step S202.

When the answer in the step S202 is in the affirmative "YES", i.e., the motion priority mode is currently taken by the image information producing means 11, the step S202 proceeds to the step S203. The gain "G" of the gain control unit 69 is then compensated by the compensation section 144 by multiplying the gain "G" by the incremental value "GIR" of the infrared addition mode as being influenced by the infrared addition mode in the step S203 when the fourth control flag "IR" of the infrared addition mode is turned off in the step S502. On the other hand, the optical black level of the optical black level adjusting unit 68 is not compensated by the compensation section 144 in the step S203 when the fourth control flag "IR" of the infrared addition mode is turned off in the step S502. This means that the optical black level is not disturbed by the addition of the infrared light. When, on the other hand, the answer in the step S202 is in the negative "NO", i.e., the motion priority mode is not currently taken by the image information producing means 11, the step S202 proceeds to the step S204. The gain "G" of the gain control unit 69 is then compensated by the compensation section 144 by multiplying the gain "G" by the incremental value "GLT" of the long exposure mode as being influenced by the long exposure mode in the step S204 when the third control flag "LT" of the long exposure mode is turned off in the step S502. The optical black level of the optical black level adjusting unit 68 is then compensated by the compensation section 144 by multiplying the optical black level "OB" by the incremental value "OBLT" of the long exposure mode in the step S205.

When, on the other hand, the answer in the step S201 is in the negative "NO", i.e., the last illumination level "LB" of the object is not equal to the level "1", the step S201 proceeds to the step S206. The judgment is then made by the compensation section 144 on whether or not the last illumination level "LB" of the object is equal to the level "2" in the step S206.

When the answer in the step S206 is in the affirmative "YES", i.e., the last illumination level "LB" of the object is equal to the level "2", the step S206 proceeds to the step S207. The judgment is then made by the compensation section 144 on whether or not the motion priority mode is currently taken by the image information producing means 11 in the step S207.

When the answer in the step S207 is in the affirmative "YES", i.e., the motion priority mode is currently taken by the image information producing means 11, the step S207 proceeds to the step S208. The gain "G" of the gain control unit 69 is then compensated by the compensation section 144 by multiplying the gain "G" by each of the incremental value "GAD" of the pixel synthesis mode and the incremental value "GIR" of the infrared addition mode as being disturbed by each of the pixel synthesis mode and the infrared addition mode in the step S208 when each of the second control flag "AD" and the fourth control flag "IR" is turned of in the step S502. The optical black level of the optical black level adjusting unit 68 is then compensated by the compensation section 144 by multiplying the optical black level "OB" by the incremental value "OBAD" of the pixel synthesis mode as being disturbed by the pixel synthesis mode in the step S209.

When, on the other hand, the answer in the step S207 is in the negative "NO", i.e., the motion priority mode is not currently taken by the image information producing means 11, the step S207 proceeds to the step S210. The gain "G" of the gain control unit 69 is then compensated by the compensation section 144 by multiplying the gain "G" by each of the incremental value "GLT" of the long exposure mode and the incremental value "GIR" of the infrared addition mode as being disturbed by each of the long exposure mode and the infrared addition mode in the step S210 when each of the third control flag "LT" of the long exposure mode and the fourth control flag "IR" of the infrared addition mode is turned off in the step S502. The optical black level of the optical black level adjusting unit 68 is then compensated by the compensation section 144 by multiplying the optical black level "OB" by the incremental value "OBLT" of the long exposure mode as being disturbed by the long exposure mode in the step S211.

When, on the other hand, the answer in the step S206 is in the negative "NO", i.e., the last illumination level "LB" of the object is equal to the level "3", the step S206 proceeds to the step S212. The gain "G" of the gain control unit 69 is then compensated by the compensation section 144 by multiplying the gain "G" by each of the incremental value "GAD" of the pixel synthesis mode, the incremental value "GLT" of the long exposure mode, and the incremental value "GIR" of the infrared addition mode as being disturbed by each of the pixel synthesis mode, the long exposure mode, and the infrared addition mode in the step S212. The gain "G" of the gain control unit 69 is then compensated by the compensation section 144 by multiplying the optical black level "OB" by each of the incremental value "OBAD" of the pixel synthesis mode and the incremental value "OBLT" of the long exposure mode as being disturbed by each of the pixel synthesis mode and the long exposure mode in the step S213.

Figure 13:
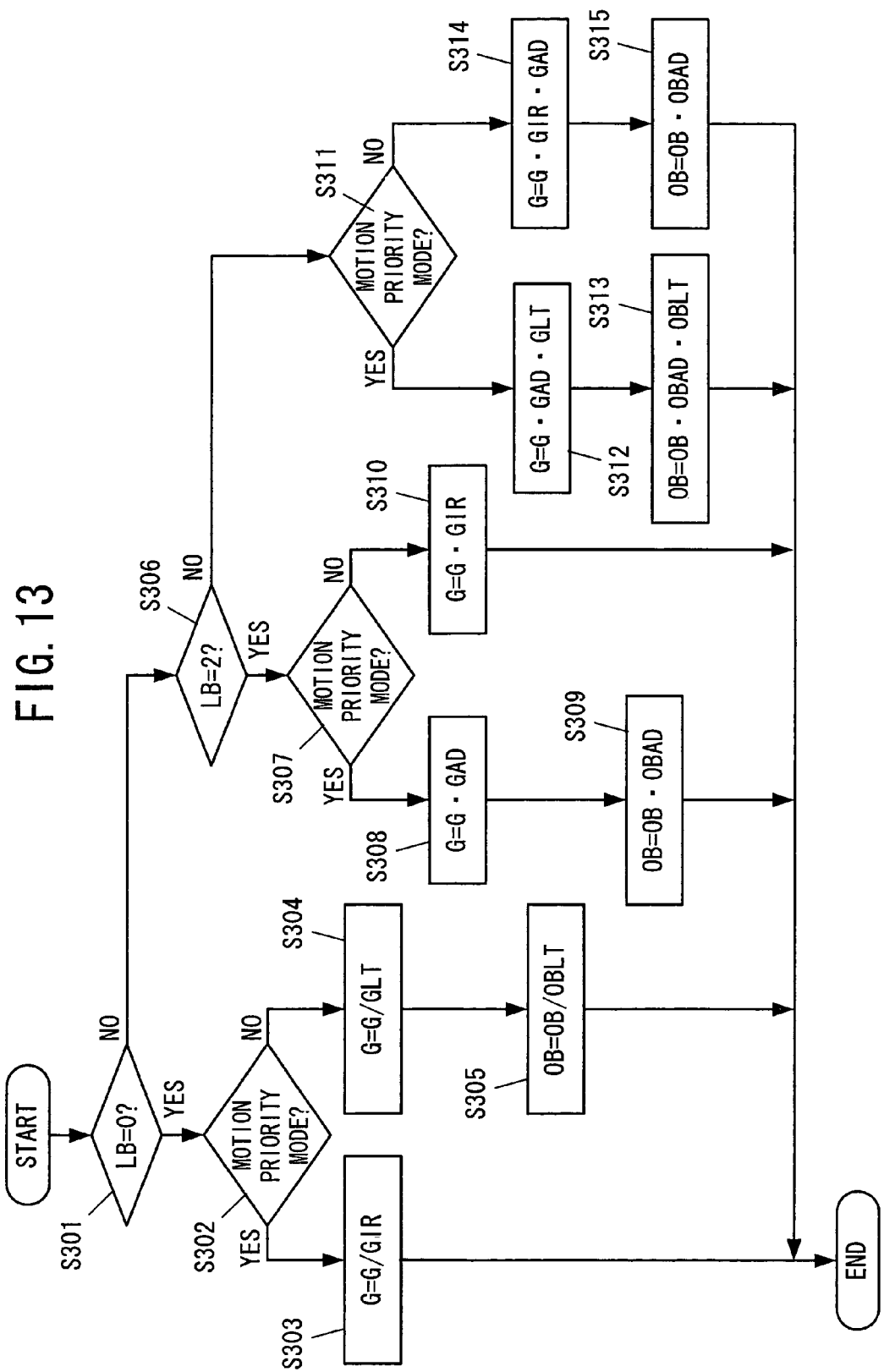
FIG. 13 is a flow chart showing a second compensation step to be executed by the compensation section of the controlling means of the first preferred embodiment of the surveillance video camera according to the present invention.

The second compensation step SI 14 will be described in detail hereinafter with reference to FIG. 13.

In the second compensation step S114, the compensation section 144 is firstly operated to judge whether or not the last illumination level "LB" of the object is equal to the level "0" in the step S301.

When the answer in the step S301 is in the affirmative "YES", i.e., the last illumination level "LB" of the object is equal to the level "0", the step S301 proceeds to the step S302. The judgment is then made by the compensation section 144 on whether or not the motion priority mode is currently taken by the image information producing means 11 in the step S302.

When the answer in the step S302 is in the affirmative "YES", i.e., the motion priority mode is currently taken by the image information producing means 11, the step S302 proceeds to the step S303. The compensation section 144 is then operated to compensate the luminance level to be adjusted by the gain control unit 69 by dividing the gain "G" by the incremental value "GIR" of the infrared addition mode in the step S303. On the other hand, the compensation section 144 is not operated to compensate the optical black level to be adjusted by the optical black level adjusting unit 68 in the step S303. This means that the optical black level of the electric signal produced by the converting section 112 are not disturbed by the addition of the infrared light.

When, on the other hand, the answer in the step S302 is in the negative "NO", i.e., the motion priority mode is not currently taken by the image information producing means 11, the step S302 proceeds to the step S304. The compensation section 144 is then operated to compensate the luminance level to be adjusted by the gain control unit 69 by dividing the gain "G" by the incremental value "GLT" of the long exposure mode in the step S304. The compensation section 144 is then operated to compensate the optical black level to be adjusted by the optical black level adjusting unit 68 by multiplying the optical black level "OB" by the incremental value "OBLT" of the long exposure mode in the step S305.

When, on the other hand, the answer in the step S301 is in the negative "NO", i.e., the last illumination level "LB" of the object is not equal to the level "0", the step S301 proceeds to the step S306. The judgment is then made by the compensation section 144 on whether or not the last illumination level "LB" of the object is not equal to the level "2" in the step S306.

When the answer in the step S306 is in the affirmative "YES", i.e., the last illumination level "LB" of the object is equal to the level "2", the step S306 proceeds to the step S307. The judgment is then made by the compensation section 144 on whether or not the motion priority mode is currently taken by the image information producing means 11 in the step S307.

When the answer in the step S307 is in the affirmative "YES", i.e., the motion priority mode is currently taken by the image information producing means 11, the step S307 proceeds to the step S308. The compensation section 144 is then operated to compensate the luminance level to be adjusted by the gain control unit 69 by multiplying the gain "G" by the incremental value "GAD" of the pixel synthesis mode in the step S308. The compensation section 144 is then operated to compensate the optical black level to be adjusted by the optical black level adjusting unit 68 by multiplying the optical black level "OB" by the incremental value "OBAD" of the pixel synthesis mode in the step S309. When, on the other hand, the answer in the step S307 is in the negative "NO", i.e., the motion priority mode is not currently taken by the image information producing means 11, the step S307 proceeds to the step S310. The compensation section 144 is then operated to compensate the luminance level to be adjusted by the gain control unit 69 by multiplying the gain by the incremental value "GIR" of the infrared addition mode in the step S310. On the other hand, the compensation section 144 is not operated to compensate the optical black level to be adjusted by the optical black level adjusting unit 68 in the step S310. This means that the optical black level of the electric signal produced by the converting section 112 are not disturbed by the addition of the infrared light.

When, on the other hand, the answer in the step S306 is in the negative "NO", i.e., the last illumination level "LB" of the object is equal to the level "3", the step S306 proceeds to the step S311. The judgment is then made by the compensation section 144 on whether or not the motion priority mode is currently taken by the image information producing means 11 in the step S311.

When the answer in the step S307 is in the affirmative "YES", i.e., the motion priority mode is currently taken by the image information producing means 11, the step S307 proceeds to the step S312. The compensation section 144 is then operated to compensate the luminance level to be adjusted by the gain control unit 69 by multiplying the gain "G" by each of the incremental value "GAD" of the pixel synthesis mode and the incremental value "GLT" of the long exposure mode in the step S312. The compensation section 144 is then operated to compensate the optical black level to be adjusted by the optical black level adjusting unit 68 by multiplying the optical black level "OB" by each of the incremental value "OBAD" of the pixel synthesis mode and the incremental value "OBLT" of the long exposure mode in the step S313.

When, on the other hand, the answer in the step S307 is in the negative "NO", i.e., the motion priority mode is not currently taken by the image information producing means 11, the step S307 proceeds to the step S314. The compensation section 144 is then operated to compensate the luminance level to be adjusted by the gain control unit 69 by each of the incremental value "GAD" of the pixel synthesis mode and the incremental value "GLT" of the long exposure mode in the step S314. The compensation section 144 is then operated to compensate the optical black level to be adjusted by the optical black level adjusting unit 68 by multiplying the optical black level "OB" by the incremental value "OBAD" of the pixel synthesis mode in the step S315.

Figure 14:
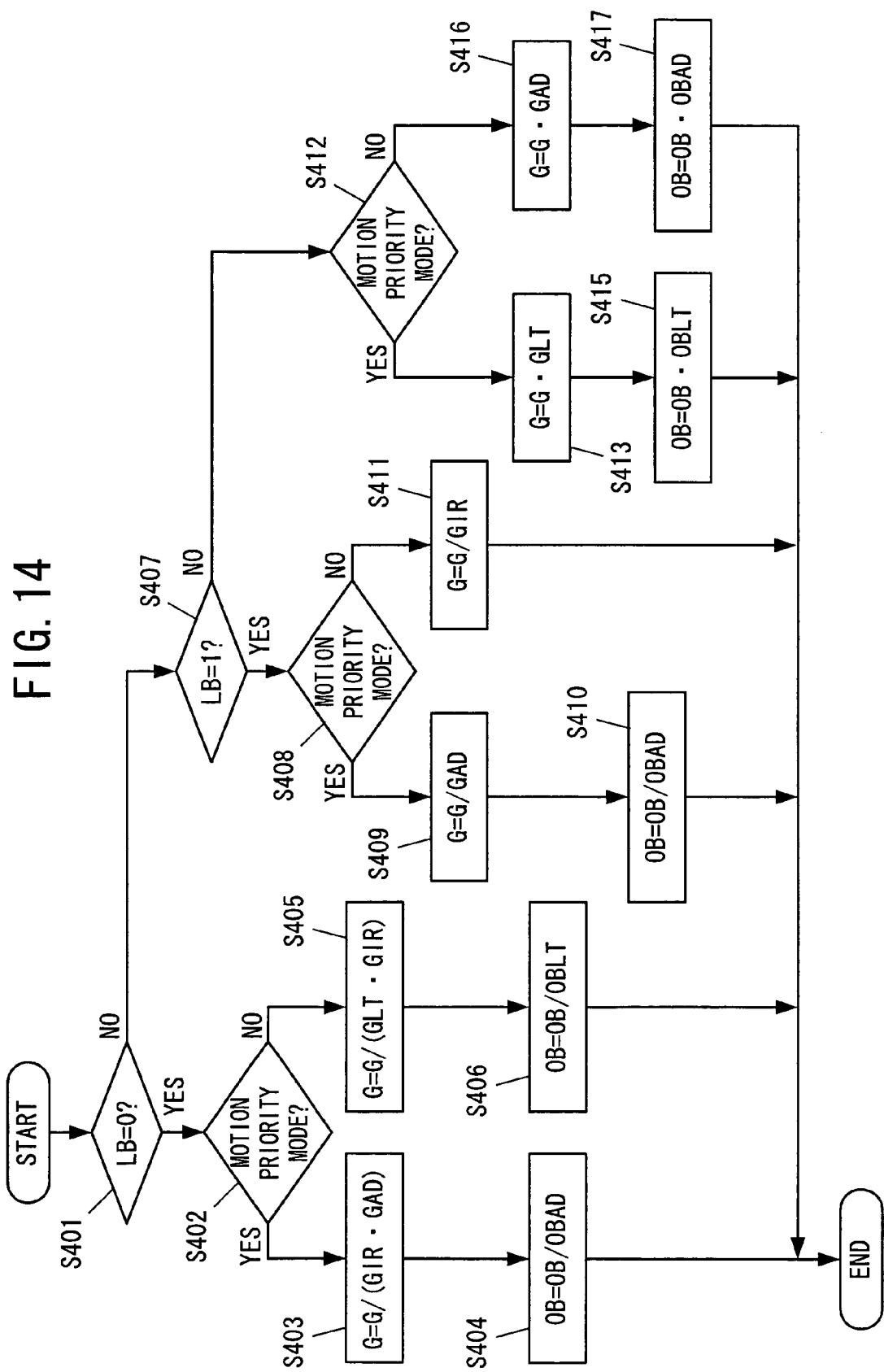
FIG. 14 is a flow chart showing a third compensation step to be executed by the compensation section of the controlling means of the first preferred embodiment of the surveillance video camera according to the present invention.

The third compensation step S116 will be described in detail hereinafter with reference to FIG. 14.

In the third compensation step S116, the compensation section 144 is firstly operated to judge whether or not the last illumination level "LB" of the object is equal in level to the level "0" of the object in the step S401.

When the answer in the step S401 is in the affirmative "YES", i.e., the last illumination level "LB" of the object is equal to the level "0", the step S401 proceeds to the step S402. The judgment is then made by the compensation section 144 on whether or not the motion priority mode is currently taken by the image information producing means 11 in the step S402.

When the answer in the step S402 is in the affirmative "YES", i.e., the motion priority mode is currently taken by the image information producing means 11, the step S402 proceeds to the step S403. The compensation section 144 is then operated to compensate the luminance level to be adjusted by the gain control unit 69 by dividing the gain "G" by each of the incremental value "GIR" of the infrared addition mode and the incremental value "GAD" of the pixel synthesis mode in the step S403. The compensation section 144 is then operated to compensate the optical black level to be adjusted by the optical black level adjusting unit 68 by dividing the optical black level "OB" by the incremental value "OBAD" of the pixel synthesis mode in the step S404. When, on the other hand, the answer in the step S402 is in the negative "NO", i.e., the motion priority mode is not currently taken by the image information producing means 11, the step S402 proceeds to the step S405. The compensation section 144 is then operated to compensate the luminance level to be adjusted by the gain control unit 69 by dividing the gain "G" by each of the incremental value "GLT" of the long exposure mode and the incremental value "GIR" of the infrared addition mode in the step S405. The compensation section 144 is then operated to compensate the optical black level to be adjusted by the optical black level adjusting unit 68 by dividing the optical black level "OB" by the incremental value "OBLT" of the long exposure mode in the step S406.

When, on the other hand, the answer in the step S401 is in the negative "NO", i.e., the last illumination level "LB" of the object is not equal to the level "0", the step S401 proceeds to the step S407. The judgment is then made by the compensation section 144 on whether or not the last illumination level "LB" of the object is equal to the level "1" in the step S407.

When the answer in the step S407 is in the affirmative "YES", i.e., the last illumination level "LB" of the object is equal to the level "1", the step S407 proceeds to the step S408. The judgment is then made by the compensation section 144 on whether or not the motion priority mode is currently taken by the image information producing means 11 in the step S408.

When the answer in the step S408 is in the affirmative "YES", i.e., the motion priority mode is currently taken by the image information producing means 11, the step S408 proceeds to the step S409. The compensation section 144 is then operated to compensate the luminance level to be adjusted by the gain control unit 69 by dividing the gain "G" by the incremental value "GAD" of the pixel synthesis mode in the step S409. The compensation section 144 is then operated to compensate the optical black level to be adjusted by the optical black level adjusting unit 68 by dividing the optical black level "OB" by the incremental value "OBAD" of the pixel synthesis mode in the step S410.

When, on the other hand, the answer in the step S407 is in the negative "NO", i.e., the motion priority mode is not currently taken by the image information producing means 11, the step S407 proceeds to the step S411. The compensation section 144 is then operated to compensate the luminance level to be adjusted by the gain control unit 69 by dividing the gain "G" by the incremental value "GIR" of the infrared addition mode in the step S411. On the other hand, the compensation section 144 is not operated to compensate the optical black level to be adjusted by the optical black level adjusting unit 68. This means that the optical black level of the electric signal produced by the converting section 112 are not disturbed by the addition of the infrared light. When, on the other hand, the answer in the step S407 is in the negative "NO", i.e., the last illumination level "LB" of the object is not equal to the level "3", the step S407 proceeds to the step S412. The judgment is then made by the compensation section 144 on whether or not the motion priority mode is currently taken by the image information producing means 11 in the step S412.

When the answer in the step S412 is in the affirmative "YES", i.e., the motion priority mode is currently taken by the image information producing means 11, the step S412 proceeds to the step S413. The compensation section 144 is then operated to compensate the luminance level to be adjusted by the gain control unit 69 by multiplying the gain by the incremental value "GLT" of the long exposure mode in the step S413. The compensation section 144 is then operated to compensate the optical black level to be adjusted by the optical black level adjusting unit 68 by dividing the optical black level "OB" by the incremental value "OBLT" of the long exposure mode in the step S414. When, on the other hand, the answer in the step S412 is in the negative "NO", i.e., the motion priority mode is not currently taken by the image information producing means 11, the step S412 proceeds to the step S416. The compensation section 144 is then operated to compensate the luminance level to be adjusted by the gain control unit 69 by multiplying the gain "G" by the incremental value "GAD" of the pixel synthesis mode in the step S416. The compensation section 144 is then operated to compensate the optical black level to be adjusted by the optical black level adjusting unit 68 by dividing the optical black level "OB" by the incremental value "OBAD" of the pixel synthesis mode in the step S417.

Figure 15:
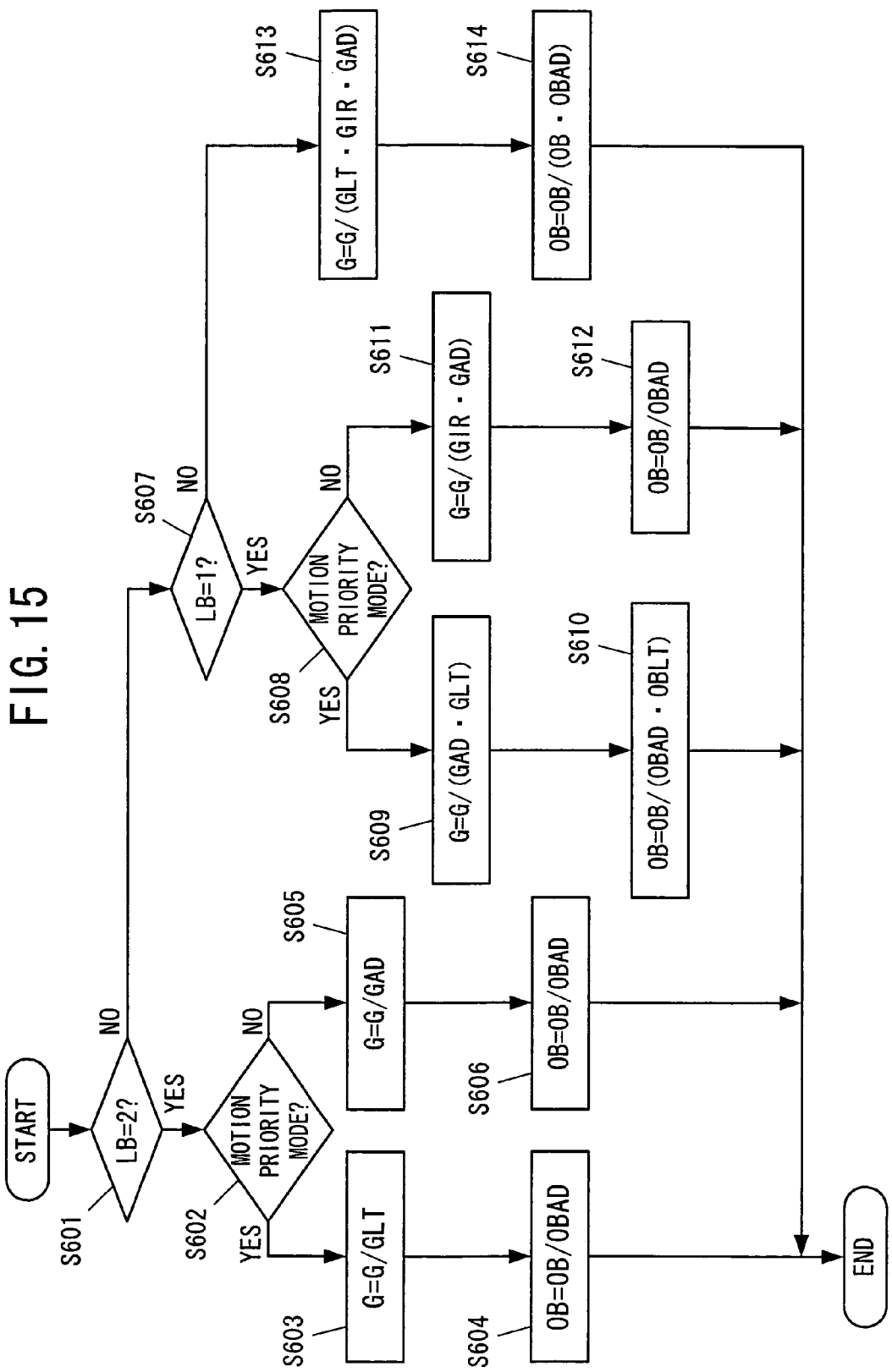
FIG. 15 is a flow chart showing a fourth compensation step in which the optical black level and the luminance level is compensated by the compensation section of the controlling means of the first preferred embodiment of the surveillance video camera according to the present invention.

The fourth compensation step S118 will be described in detail hereinafter with reference to FIG. 15.

The compensation section 144 is firstly operated to judge whether or not the last illumination level "LB" of the object is equal in level to the level "2" of the object in the step S601.

When the answer in the step S601 is in the affirmative "YES", i.e., the last illumination level "LB" of the object is equal to the level "2", the step S601 proceeds to the step S602. The judgment is then made by the compensation section 144 on whether or not the motion priority mode is currently taken by the image information producing means 11 in the step S602.

When the answer in the step S602 is in the affirmative "YES", i.e., the motion priority mode is currently taken by the image information producing means 11, the step S602 proceeds to the step S603. The compensation section 144 is then operated to compensate the luminance level to be adjusted by the gain control unit 69 by dividing the gain "G" by the incremental value "GLT" of the long exposure mode in the step S603. The compensation section 144 is then operated to compensate the optical black level to be adjusted by the optical black level adjusting unit 68 by dividing the optical black level "OB" by the incremental value "OBLT" of the long exposure mode in the step S604. When, on the other hand, the answer in the step S602 is in the negative "NO", i.e., the motion priority mode is not currently taken by the image information producing means 11, the step S602 proceeds to the step S605. The compensation section 144 is then operated to compensate the luminance level to be adjusted by the gain control unit 69 by dividing the gain "G" by the incremental value "GAD" of the pixel synthesis mode in the step S605. The compensation section 144 is then operated to compensate the optical black level to be adjusted by the optical black level adjusting unit 68 by dividing the optical black level "OB" by the incremental value "OBAD" of the pixel synthesis mode in the step S606.

When, on the other hand, the answer in the step S601 is in the negative "NO", i.e., the last illumination level "LB" of the object is not equal to the level "2", the step S601 proceeds to the step S607. The judgment is then made by the compensation section 144 on whether or not the last illumination level "LB" of the object is equal to the level "1" in the step S607.

When the answer in the step S607 is in the affirmative "YES", i.e., the last illumination level "LB" of the object is equal to the level "1", the step S607 proceeds to the step S608. The judgment is then made by the compensation section 144 on whether or not the motion priority mode is currently taken by the image information producing means 11 in the step S608.

When the answer in the step S608 is in the affirmative "YES", i.e., the motion priority mode is currently taken by the image information producing means 11, the step S608 proceeds to the step S609. The compensation section 144 is then operated to compensate the luminance level to be adjusted by the gain control unit 69 by dividing the gain "G" by each of the incremental value "GAD" of the pixel synthesis mode and the incremental value "GLT" of the long exposure mode in the step S609. The compensation section 144 is then operated to compensate the optical black level to be adjusted by the optical black level adjusting unit 68 by dividing the optical black level "OB" by each of the incremental value "OBAD" of the pixel synthesis mode and the incremental value "GLT" of the long exposure mode in the step S610. When, on the other hand, the answer in the step S608 is in the negative "NO", i.e., the motion priority mode is not currently taken by the image information producing means 11, the step S608 proceeds to the step S611. The compensation section 144 is then operated to compensate the luminance level to be adjusted by the gain control unit 69 by dividing the gain "G" by each of the incremental value "GAD" of the pixel synthesis mode and the incremental value "GIR" of the infrared addition mode in the step S611. The compensation section 144 is then operated to compensate the optical black level to be adjusted by the optical black level adjusting unit 68 by dividing the optical black level "OB" by the incremental value "OBAD" of the pixel synthesis mode in the step S612.

When the answer in the step S607 is in the negative "NO", i.e., the last illumination level "LB" of the object is equal to the level "0", the step S607 proceeds to the step S613. The compensation section 144 is then operated to compensate the luminance level to be adjusted by the gain control unit 69 by dividing the gain "G" by each of the incremental value "GAD" of the pixel synthesis mode, the incremental value "GLT" of the long exposure mode, and the incremental value "GIR" of the infrared addition mode in the step S613. The compensation section 144 is then operated to compensate the optical black level to be adjusted by the optical black level adjusting unit 68 by dividing the optical black level "OB" by each of the incremental value "OBAD" of the pixel synthesis mode and the incremental value "OBLT" of the long exposure mode in the step S614.

From the above detail description, it will be understood that the surveillance video camera according to the second preferred embodiment of the present invention can take images optimally without being affected by the rapid fluctuation of each of the optical black level and the illumination level by reason that the image information producing means 11 includes an adjusting section 114 for adjusting the optical black level and the luminance level of the electric signal produced by the converting section 112, and the controlling means 14 includes a compensation section 144 for compensate the optical black level and the luminance level to be adjusted by the adjusting section 114 when each of the sensitivity enhancing units 113 is operated to start to enhance, and to stop enhancing the sensitivity of the converting section 112.

As will be seen from the forgoing description, the second preferred embodiment of the surveillance video camera can take an image of an object at relatively high quality while preventing, the optical black level and the luminance level from being rapidly disturbed by enhancing the sensitivity of the converting section by reason that the imaging information producing means further includes an adjusting section for adjusting an optical black level and a gain of the electric signal produced by the converting section, and the controlling means further includes a compensation section for compensate the optical black level and the gain to be adjusted by the adjusting section when each of the sensitivity enhancing units is operated to start to enhance, and to stop enhancing the sensitivity of the converting section.

While the subject invention has been described with respect to the preferred embodiment, various modifications and adaptations thereof will now be apparent to those skilled in the art as far as such modifications and adaptations fall within the scope of the appended claims.

What is claimed is:

1. A surveillance video camera to be operative in combination with a surveillance system for watching an object, comprising:
   image information producing means for producing image information indicative of said object;
   video signal producing means for producing a video signal on the basis of said image information produced by said image information producing means; and
   controlling means for controlling each of said image information producing means and said video signal producing means to ensure that said object is watched by said surveillance system through said video signal produced by said video signal producing means, wherein
   said image information producing means includes:
   an optical section having passed therethrough light to be provided as an image indicative of said object;
   a converting section having a sensitivity to said light, said converting section being constituted by a plurality of pixel units classified into a plurality of pixel groups, each of which is constituted by at least two pixels adjacent to each other, said pixel units are exposed to said light provided through said optical section over an exposure period to sense said image; and a plurality of sensitivity enhancing units for enhancing said sensitivity of said converting section, said sensitivity enhancing units includes:

a first sensitivity enhancing unit for allowing each of said pixel groups to function as one pixel;

a second sensitivity enhancing unit for extending said exposure period to have said converting section sense said image under the condition that said pixel units are exposed to light passed through said optical section over an extended exposure period; and a third sensitivity enhancing unit for removing an infrared light elimination filter located on an optical path between said optical section and said converting section, said controlling means includes:

a surveillance mode selecting section for selectively setting at least two surveillance modes including a motion priority mode and a resolution priority mode, and an executing section for allowing said first to third sensitivity enhancing units to start and stop in predetermined sequences, in said motion priority mode, said third enhancing unit starts before said first enhancing unit starts, and said first enhancing unit starts before said second enhancing unit starts, when the illumination intensity of said object decreases, in said resolution priority mode, said second enhancing unit starts before said third enhancing unit starts, and said third enhancing unit starts before said first enhancing unit starts, when the illumination intensity of said object decreases.

2. A surveillance video camera as set forth in claim 1, in which said executing section is adapted to allow each of said first and second sensitivity enhancing units to start in order of said first and second sensitivity enhancing unit to enhance said sensitivity of said converting section, and to allow each of said first and second sensitivity enhancing units to stop in order of said second and first sensitivity enhancing unit enhancing said sensitivity of said converting section in response to said illumination intensity in said motion priority mode.

3. A surveillance video camera as set forth in claim 1, in which said executing section is adapted to allow said first and second sensitivity enhancing units to start in order of said second and first sensitivity enhancing unit to enhance said sensitivity of said converting section, and to allow said first and second sensitivity enhancing units to stop in order of said first and second sensitivity enhancing unit enhancing said sensitivity of said converting section in response to said illumination intensity in said resolution priority mode.

4. A surveillance video camera as set forth in claim 1, in which said optical section includes a lens unit to be located in spaced relationship with said converting section, a first optical filter operable to have only visible light passed therethrough, a second optical filter operable to have both visible light and infrared lightpassed therethrough, and a switching mechanism for driving said first and second optical filters to assume two different operation states including a first operation state to allow said first optical filter to be provided between said lens unit and said converting section to ensure that said converting section is exposed to said visible light, and a second operation state to prevent said second optical filter from being provided between said lens unit and said converting section to ensure that said converting section is exposed to both said visible light and said infrared light, and in which said sensitivity enhancing units includes a third sensitivity enhancing unit for enhancing said sensitivity of said converting section by controlling said switching mechanism in response to said illumination intensity.

5. A surveillance video camera as set forth in claim 4, in which said executing section is adapted to allow each of said first to third sensitivity enhancing units to start in order of said third, first, and second sensitivity enhancing units to enhance said sensitivity of said converting section, and to allow each of said first to third sensitivity enhancing units to stop in order of said second, first, and third sensitivity enhancing units enhancing said sensitivity of said converting section in response to said illumination intensity in said motion priority mode.

6. A surveillance video camera as set forth in claim 4, in which said executing section is adapted to allow each of said first to third sensitivity enhancing units to start in order of said second, third, and first sensitivity enhancing units to enhance said sensitivity of said converting section, and to allow each of said first to third sensitivity enhancing units to stop in order of said first, third, and second sensitivity enhancing units enhancing said sensitivity of said converting section in response to said illumination intensity in said motion priority mode.

7. A surveillance video camera as set forth in claim 1, in which said controlling means further includes a luminance level monitoring section for judging whether or not luminance level of said video signal produced by said video signal producing means is within a predetermined range, and in which said executing section is adapted to allow each of said sensitivity enhancing units to start, in sequence corresponding to said surveillance mode selected by said surveillance mode selecting section, to enhance said sensitivity of said converting section, and to stop in said inverse order of said sequence enhancing said sensitivity of said converting section on the basis of the judgment of said illumination level monitoring section.

8. A surveillance video camera as set forth in claim 1, in which said image information producing means further includes an adjusting section for adjusting an optical black level and a gain of an electric signal produced by said converting section, and in which said controlling means further includes a compensation section for compensate said optical black level and said gain to be adjusted by said adjusting section when each of said sensitivity enhancing units is operated to start to enhance, and to stop enhancing said sensitivity of said converting section.

9. A surveillance video camera as set forth in claim 1, in which said controlling means further includes motion judging section for judging whether or not said object is slow in action in comparison with a predetermined threshold level on the basis of said image information produced by said image information producing means, and said executing section is adapted to adjust said luminance level by allowing said sensitivity enhancing units to start, in sequence corresponding to said surveillance mode selected by said surveillance mode selecting section, to enhance said sensitivity of said converting section in response to said illumination intensity on the basis of the judgment made by said motion judging section, and to stop enhancing said sensitivity of said converting section.

* * * * *

UNITED STATES PATENT AND TRADEMARK OFFICE
CERTIFICATE OF CORRECTION

| | | |
|---|---|---|
| PATENT NO. | : 7,649,547 B2 | Page 1 of 1 |
| APPLICATION NO. | : 10/941456 | |
| DATED | : January 19, 2010 | |
| INVENTOR(S) | : Haruo Kogane et al. | |

It is certified that error appears in the above-identified patent and that said Letters Patent is hereby corrected as shown below:

Column 19, line 37, please replace "SI 14" with --S114--,

Column 25, line 59, please replace the word "lightpassed" with the words --light passed--.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,649,547 B2  Page 1 of 1
APPLICATION NO. : 10/941456
DATED : January 19, 2010
INVENTOR(S) : Kogane et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Twenty-third Day of November, 2010

David J. Kappos
*Director of the United States Patent and Trademark Office*